(12) United States Patent
Otani et al.

(10) Patent No.: US 6,388,980 B2
(45) Date of Patent: May 14, 2002

(54) DISC DRIVE

(75) Inventors: Hisao Otani; Akihiro Miyazaki, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/799,552

(22) Filed: Mar. 7, 2001

Related U.S. Application Data

(62) Division of application No. 09/336,025, filed on Jun. 18, 1999.

(30) Foreign Application Priority Data

Jun. 22, 1998 (JP) ............................................. 10-174271

(51) Int. Cl.⁷ .............................................. G11B 21/02
(52) U.S. Cl. ...................................................... 369/219
(58) Field of Search ................................ 369/219, 215, 369/220, 244, 75.2, 77.2

(56) References Cited

U.S. PATENT DOCUMENTS

| | | | | | |
|---|---|---|---|---|---|
| 5,761,182 A | * | 6/1998 | Jeon | ............................ | 369/219 |
| 5,764,618 A | * | 6/1998 | Kim | ............................ | 369/219 |
| 5,768,248 A | * | 6/1998 | Lee | ............................. | 369/219 |
| 6,046,974 A | * | 4/2000 | Uehara | ......................... | 369/219 |
| 6,178,154 B1 | * | 1/2001 | Inata et al. | .................. | 369/219 |

* cited by examiner

*Primary Examiner*—Allen Cao
(74) *Attorney, Agent, or Firm*—Oblon, Spivak, McClelland, Maier & Neustadt, P.C.

(57) ABSTRACT

A disc transport member whose width for mounting of a disc is smaller than the diameter of the disc is inserted into and removed from a drive main body while being mounted with the disc. A disc protection member is provided, so as to face the disc, on an edge of the disc transport member or a region close thereto on a side where the disc that is mounted on the disc transport member projects.

7 Claims, 31 Drawing Sheets

A-A FRONT VIEW

B-B BACK VIEW

C-C SIDE VIEW

D-D SIDE VIEW

E-E CROSS-SECTION

F-F CROSS-SECTION

G-G CROSS-SECTION

FIG. 24 (A)
H-H CROSS-SECTION
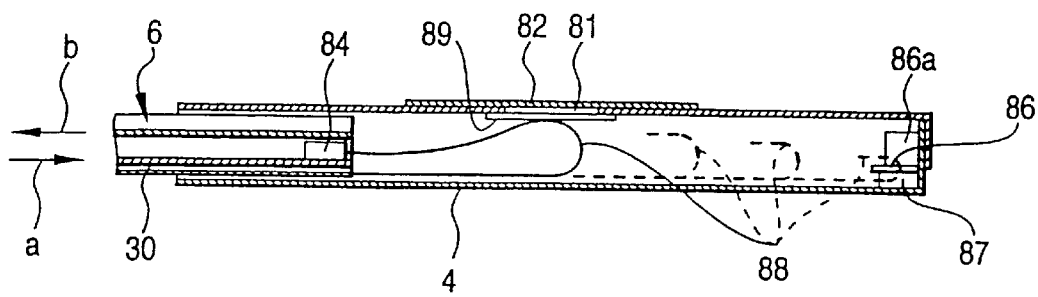
FIG. 24 (B)
FIG. 24 (C)
I-I CROSS-SECTION
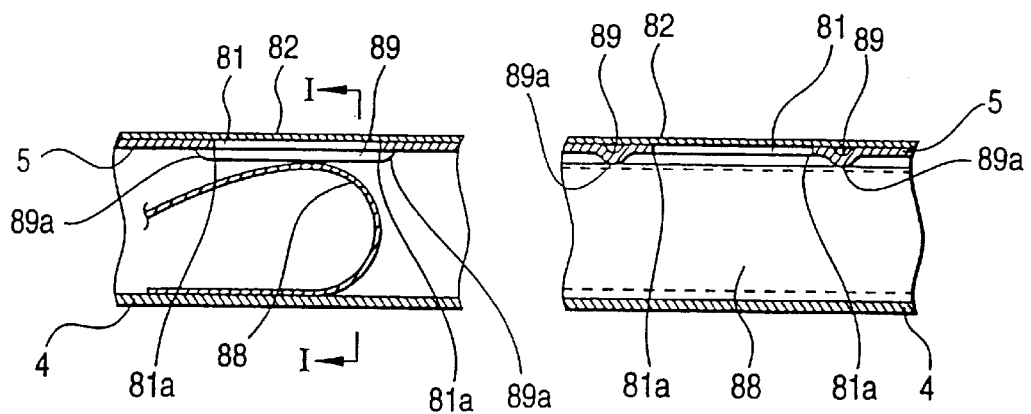

J-J CROSS-SECTION

L-L CROSS-SECTION

L-L CROSS-SECTION

M-M SIDE VIEW

N-N CROSS-SECTION

N-N CROSS-SECTION

O-O SIDE VIEW

P-P TOP VIEW

Q-Q SIDE VIEW

R-R SIDE VIEW

S-S CROSS-SECTION

DISC DRIVE

This application is a Division of application Ser. No. 09/336,025 filed on Jun. 18, 1999.

BACKGROUND OF THE INVENTION

1. Field of the Invention

The present invention relates to a disc drive that is most suitably used as a thin, small-size optical disc drive, for example. In particular, the invention relates to a technique of inserting and removing a disc-shaped recording medium into and from a drive main body by means of a disc transport member such as a drawer or a tray.

2. Description of the Related Art

Conventionally, in thin, small-size optical disc drives that drive an optical disc such as a CD-ROM and are mounted in notebook-sized personal computers etc., the mainstream type is such that an optical disc is inserted into and removed from a drive main body by means of a drawer or a tray. As shown in FIGS. 1(A)–1(C), an optical disc drive of this type that has been design-registered (IBM Corp.) is such that the width $W_4$ of a drawer main body 6a that is mounted with a spindle motor having a self-chucking-type disc table is made smaller than the diameter D of an optical disc, so that the drawer occupies a smaller space when drawn out of the drive main body and the drive main body can be made smaller.

However, in the optical disc drive in which the width $W_4$ of the drawer is made smaller than the diameter D of an optical disc, if the optical disc 2 is inclined inadvertently as shown in FIG. 1(A) in an attempt of mounting an optical disc 2 on a disc table 12 according to a self-chucking method, the data recording surface 2a of the optical disc 2 may hit the edge 6h of the drawer main body 6a on the optical disc projection side and may be scratched easily or damaged due to impact. Even when the optical disc 2 is mounted on the disc table 12 levelly, if the mounting force is so strong that the outer circumference 2b of the optical disc 2 is bent down as shown in FIG. 1(B), the data recording surface 2a of the optical disc 2 may also hit the edge 6h of the drawer main body 6a on the optical disc projection side and may be scratch easily or damaged due to impact. Further, when the optical disc 2 is removed from the disc table 12, if the optical disc 2 is inclined inadvertently as shown in FIG. 1(C), the data recording surface 2a of the optical disc 2 may also hit the edge 6h of the drawer main body 6a on the optical disc projection side and may be scratched easily or damaged due to impact. In such a case, the reliability of data is extremely lowered.

In the above type of thin, small-size optical disc drives, almost no countermeasures against scratching and damaging of an optical disc 2 have been taken; almost only one measure taken is that the edge 6h of the drawer main body 6a is rounded.

On the other hand, if optical discs 2 are made thinner in the future, the gap between the optical disc 2 that is self-chucked on the disc table 12 and the edge 6h of the drawer main body 6a will become narrower and the chucking force of the self-chucking mechanisms of the disc table 12 will become stronger. This means that the optical disc 2 will become more prone to hit the edge 6h of the drawer main body 6a in mounting or removing the optical disc 2 and hence the data recording surface 2a of the optical disc 2 will become more prone to be scratched or damaged due to impact. Therefore, also for the purpose of protecting the property of users, it is important to take a measure against scratching and damaging of the data recording surface 2a of the optical disc 2.

Incidentally, optical disc drives are mounted with an optical pickup that records and/or reproduces data onto and/or from an optical disc by using a laser beam that is emitted through an objective lens while the objective lens is moved by a carriage between the innermost and outermost tracks of an optical disc. The carriage is moved by a lead screw that is rotationally driven by a motor.

Optical disc drives that drive an optical disc such as a CD-ROM and are mounted in notebook-sized personal computers etc. have been made thinner and smaller year after year. And to save the spaces occupied by parts, the current mainstream design of a carriage transport mechanism is such that the lead screw also serves as a guide main shaft of the carriage transport mechanism, so that no dedicated guide main shaft is necessary.

In conventional carriage transport mechanisms, three to four blocks of mechanism parts are formed by a lead screw that also serves as a guide main shaft, a pair of bearings for supporting both ends of the lead screw, a thrust pressurizing spring for pressing one end of the lead screw in the axial direction and elastically pressing the other end to a thrust receiving member, a motor and a transmission system for rotationally driving the lead screw, and other parts, and those three to four blocks of mechanism parts are attached to the base chassis of an optical pickup on a manufacturing line.

However, the conventional method of attaching three to four blocks of mechanism parts to the base chassis of an optical pickup on a manufacturing line has problems that it requires many assembling steps and is low in productivity because a step of adjusting the loads among the parts and other steps need to be conducted for each block in the final assembling step. Further, this method is low in reliability as exemplified by the facts that considerable dispersion may occur among the loads of the parts and the carriage feed load tends to be rendered unstable. Still further, in order to, for example, replace the optical pickup, it is necessary to disassemble the entire carriage transport mechanism. Therefore, the replacement or the like of the optical pickup is very cumbersome.

In drawer-type optical disc drives, the user tends to inadvertently touch, for example, the carriage of the optical pickup that is mounted on the drawer with his hand in, for example, mounting or removing an optical disc.

On the other hand, the recording density is increasing year after year in those disc drives. In particular, in the CD-R, CD-RW, DVD-RW, etc. that are data-writable, as signals on the disc formats increase in density, signals on the formats will become weaker.

Therefore, there is a problem that if static electricity comes into the carriage when, for example, the user who is charged with static electricity directly touch, for example, the carriage of the optical pickup with his hand, signals that are faint on the format are prone to be destroyed.

SUMMARY OF THE INVENTION

The present invention has been made to solve the above problems, and an object of the invention is therefore to prevent the data recording surface of a disc-shaped recording medium from being scratched or damaged when the disc-shaped recording medium is mounted or removed in a disc drive in which the disc mounting width of a disc transport member is smaller than the diameter of the disc-shaped recording medium.

Another object of the invention is to provide a disc drive which can eliminate a step of adjusting the loads among the parts in the final assembling step on a manufacturing line of the entire carriage transport mechanism.

A further object of the invention is to provide a disc drive in which a measure is taken against static electricity that comes into a carriage or some other member without increasing the number of parts or the number of assembling steps.

To attain the above objects, the invention provides a disc drive comprising a disc transport member the width of which for mounting of a disc is smaller than the diameter of the disc and which is inserted into and removed from a drive main body while being mounted with the disc; and a disc protection member provided, so as to face the disc, on an edge of the disc transport member or a region close thereto on a side where the disc that is mounted on the disc transport member projects.

In the above-configured disc drive according to the invention, even if the disc is inadvertently rendered in a state that its recording surface would otherwise hit the edge on the disc projection side in an attempt of mounting or removing the disc, the recording surface actually contacts the disc protection member. This prevents the recording surface from directly hitting the edge of the disc transport member.

According to another aspect of the invention, there is provided a disc drive in which at least a lead screw for moving a carriage and a motor and a transmission system for driving the lead screw are incorporated in a one-piece unit base. With this configuration, the entire carriage transport mechanism can be rendered a unit.

According to a further aspect of the invention, there is provided a disc drive comprising a carriage that is mounted with an optical pickup for recording or reproducing a signal onto or from a disc, a lead screw elastically for moving the carriage, and a spring member for pressing the lead screw against a thrust receiving member, wherein the spring member effects grounding between the carriage, a unit chassis, and a drive main body.

In the above disc drive according to the invention, since the carriage can be grounded by the spring member that presses the lead screw, even if static electricity enters the carriage or some other member when, for example, the user touches it with his hand, the static electricity can safely be led to the ground.

BRIEF DESCRIPTION OF THE DRAWINGS

FIG. 24(A) is a sectional view taken along line H—H in FIG. 20 and illustrating a relationship between a flexible printed circuit board and the top cover of the optical disc drive of FIG. 2;

FIG. 24(B) is an enlarged sectional view of the main part of FIG. 24(A);

FIG. 24(C) is a sectional view taken along line I—I in FIG. 24(B);

DETAILED DESCRIPTION OF THE PREFERRED EMBODIMENT

Figure 1:
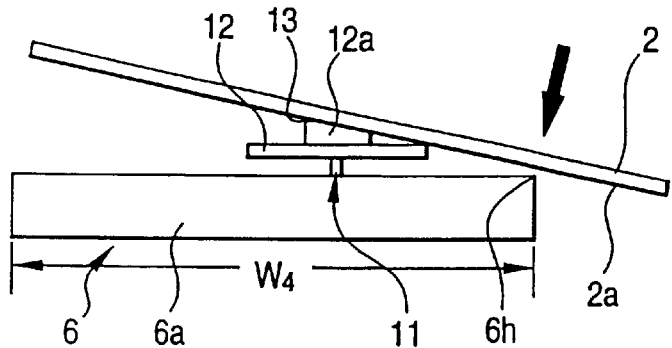
FIGS. 1A–1C show that an optical disc is prone to be scratched or damaged in a conventional disc drive when it is mounted on or removed from a drawer.
Figure 1:
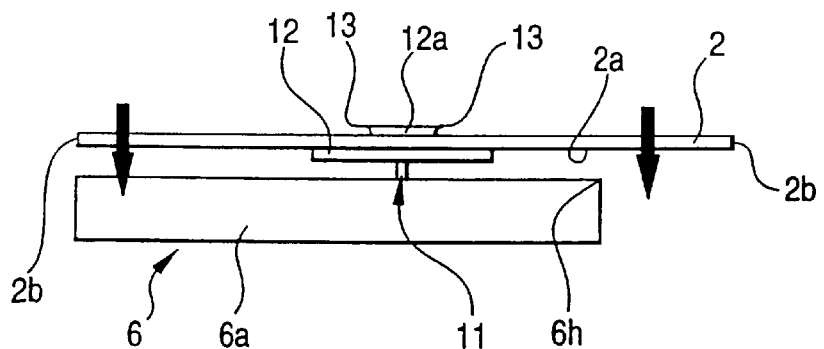
Figure 1:
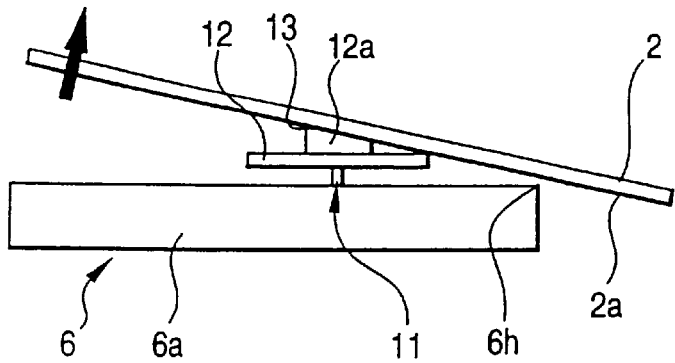

An optical disc drive according to an embodiment of the present invention will be hereinafter described with reference to the accompanying drawings in the following order:

(1) Outline of optical disc drive
(2) Outline of drive main body internal configuration
(3) Carriage transport mechanism unit
(4) Skew adjustment mechanism
(5) Thinning of drive main body
(6) Drawer lock and ejection mechanism
(7) Grounding method of carriage etc.
(8) Disc protection member of drawer
(9) Assembling of bottom chassis and top cover of drive main body

(1) Outline of Optical Disc Drive

First, the outline of the optical disc drive will be described with reference to FIGS. 2–10 and 18–22.

The optical disc drive 1 that is an example of a recording/reproduction apparatus including a disc drive according to the invention is approximately of the same type (the thickness has been reduced further in recent years) as the thin, small-size optical disc drive that is design-registered (IBM Corp.). The optical disc drive uses, as a disc-shaped recording medium, an optical disc 2 such as a CD-ROM having a diameter D of 12 cm (future transition to high-density recording discs such as the CD-R, CD-RW, DVD-RW, etc. is expected), and is to be mounted in notebook-sized personal computers etc.

The optical disc drive 1 is composed of a drive main body 3 as a recording/reproduction apparatus main body and a flat drawer 6 as a disc transport member for inserting and removing an optical disc 2 into and from the drive main body 3 levelly in the directions indicated by arrows a and b. As shown in FIGS. 4–8, in a state that the drawer 6 is accommodated in the drive main body 3, the entire optical disc drive 1 is thin and small as represented by the following external dimensions: width $W_1$=about 128 mm, depth $D_1$=about 129.1 mm, and thickness (height) $T_1$=about 13.9 mm.

As shown in FIGS. 2–10, the outer chassis of the drive main body 3 is composed of a bottom chassis 4 and a top cover 5 that have been formed by sheet metal pressing, and assumes a flat box shape. The lower portion of the drive main body 3 is a small width portion 3a having a width $W_2$ of about 102.6 mm and its upper portion is a large width portion 3b having the width $W_1$ of about 128 mm. While the small width portion 3a and the large width portion 3b are flush with each other on the left side, the right-hand side face of the large width portion 3b projects rightward and horizontally from that of the small width portion 3a by a projection length $W_3$=$W_1$−$W_2$=about 25.4 mm. An approximately L-shaped front opening 3c is formed at the front end (in the direction indicated by arrow b) of the drive main body 3 so as to bridge the small width portion 3a and the large width portion 3b. Therefore, the drive main body 3 is formed with a cut 7 having the width $W_3$ at the bottom-right position. The large width portion 3b (i.e., the upper portion of the drive main body 3) is formed with an approximately triangular cut 8 at the rear end (in the direction indicated by arrow a).

The drawer 6 is composed of a drawer main body 6a and a front panel 6b that have been molded with a synthetic resin. The drawer main body 6a is of a flat, level, rectangular shape having a width $W_4$ of about 98.5 mm that is a little smaller than the width $W_2$ of the small width portion 3a of the drive main body 3. The front panel 6b is of a rectangular shape whose width and thickness (height) are a little greater than the width $W_1$ and the thickness $T_1$ of the drive main body 3. The front panel 6b is attached to the front end of the drawer main body 6a with screws, dowel fitting, bonding, or by some other method so as to be erected vertically, extend in the right-left direction, and be offset rightward to a large extent. Therefore, the diameter D of the optical disc 2, the width $W_1$ of the large width portion 3a of the drive main body 3, and the width $W_4$ of the drawer main body 6a of the drawer 6 have a relationship $W_4$<D<$W_1$. The drawer 6 is so constructed that the drawer main body 6a can be inserted and drawn levelly in the directions indicated by arrows a and b into and out of the small width portion 3a (i.e., the lower portion) of the drive main body 3 by means of a guide rail mechanism (described later).

Figure 2:
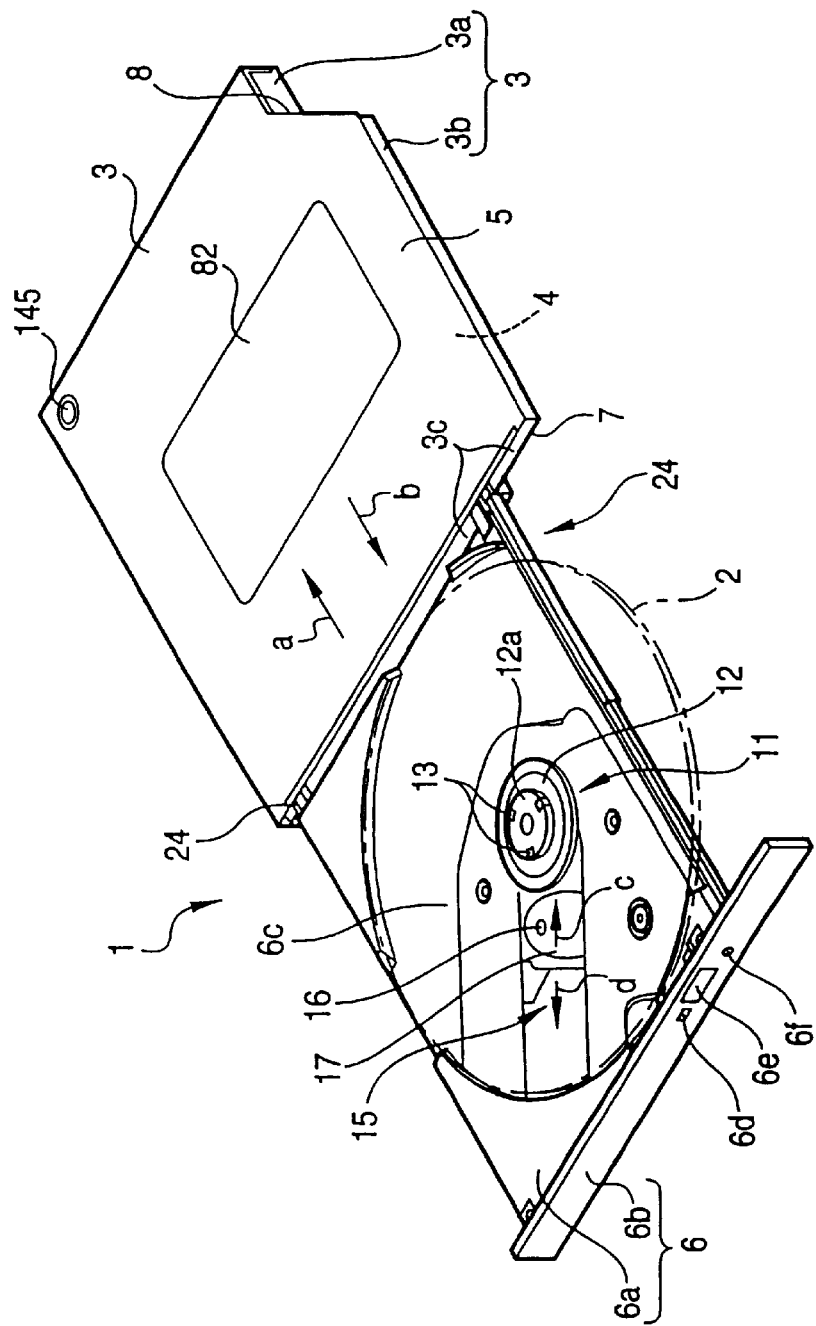
FIG. 2 is a perspective view showing a state that a drawer of a drawer-type optical disc drive according to the invention is drawn out of a drive main body.
Figure 3:
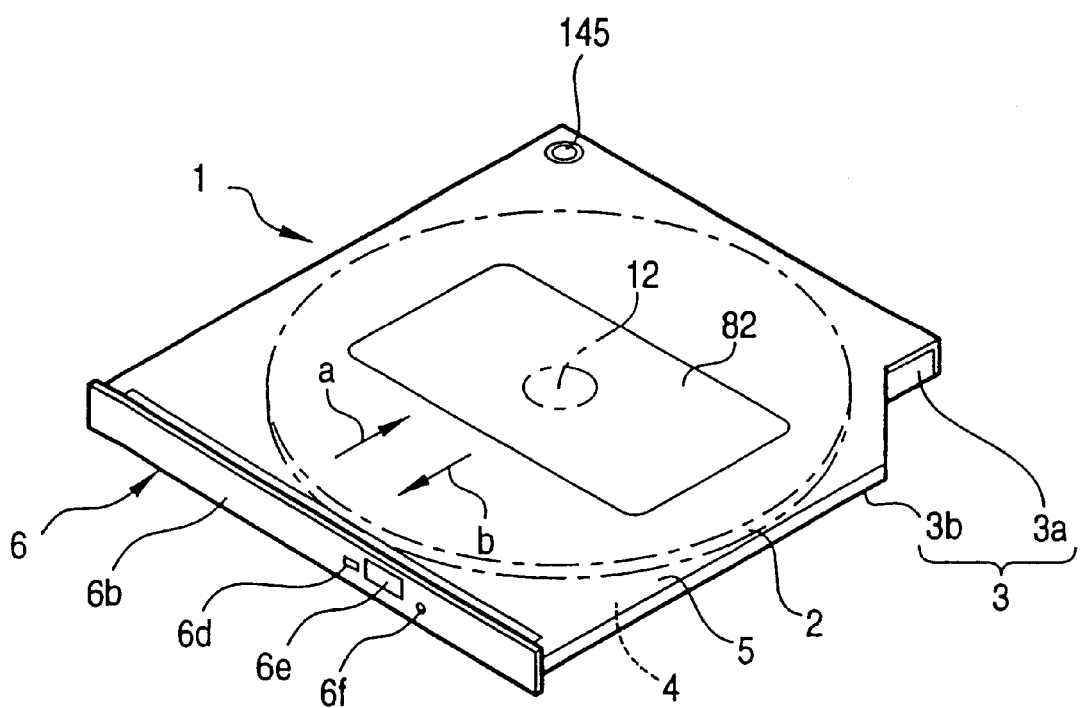
FIG. 3 is a perspective view showing a state that the drawer of the optical disc drive of FIG. 2 is pushed in the drive main body.
Figure 4:
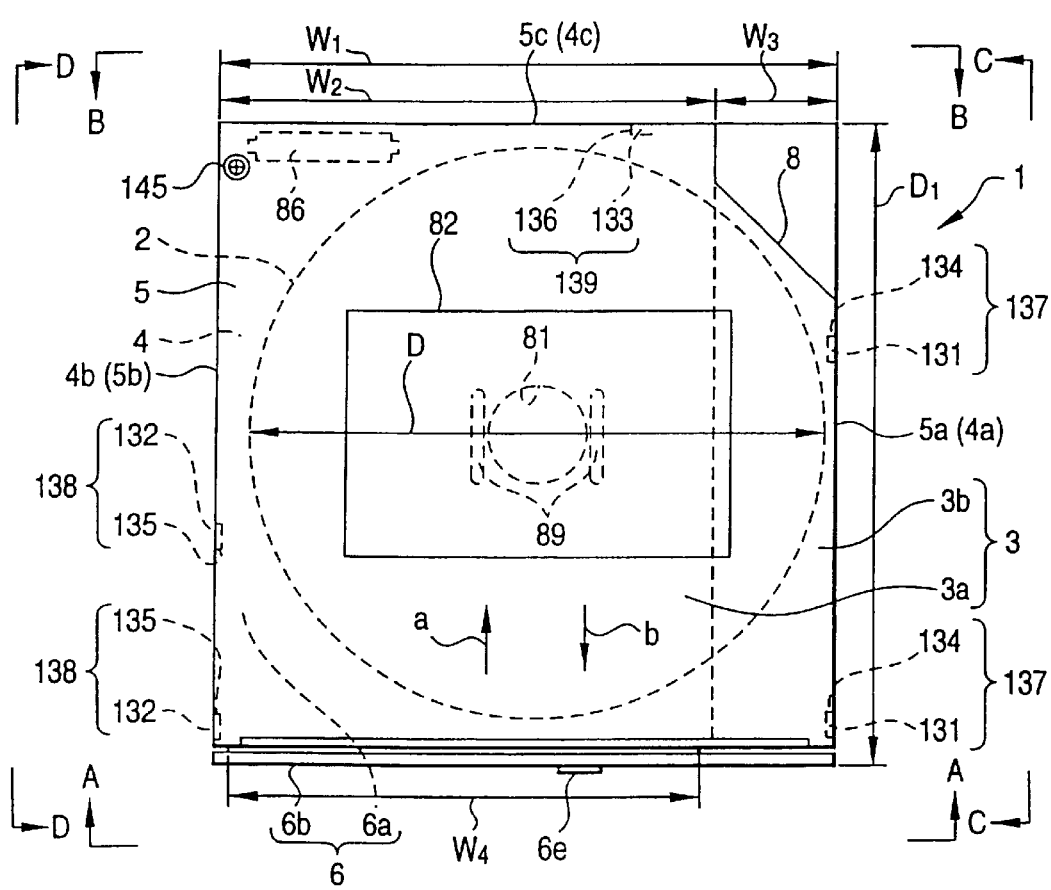
FIG. 4 is a top view of the optical disc drive in the state of FIG. 3.
Figure 5:
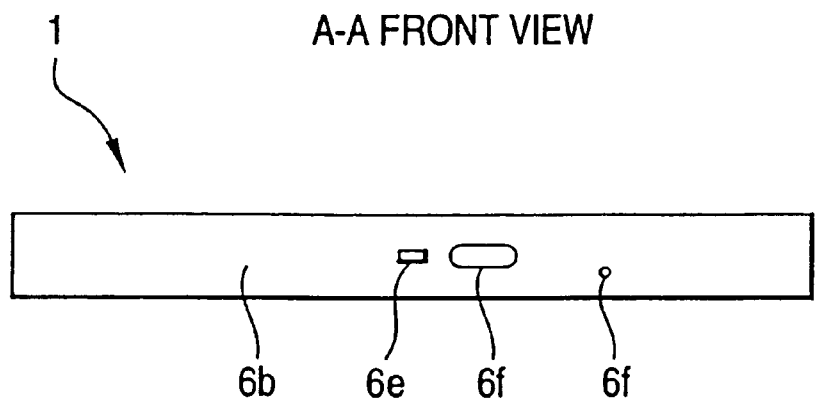
FIG. 5 is a front view of the optical disc drive as viewed according to arrows A in FIG. 4.
Figure 6:
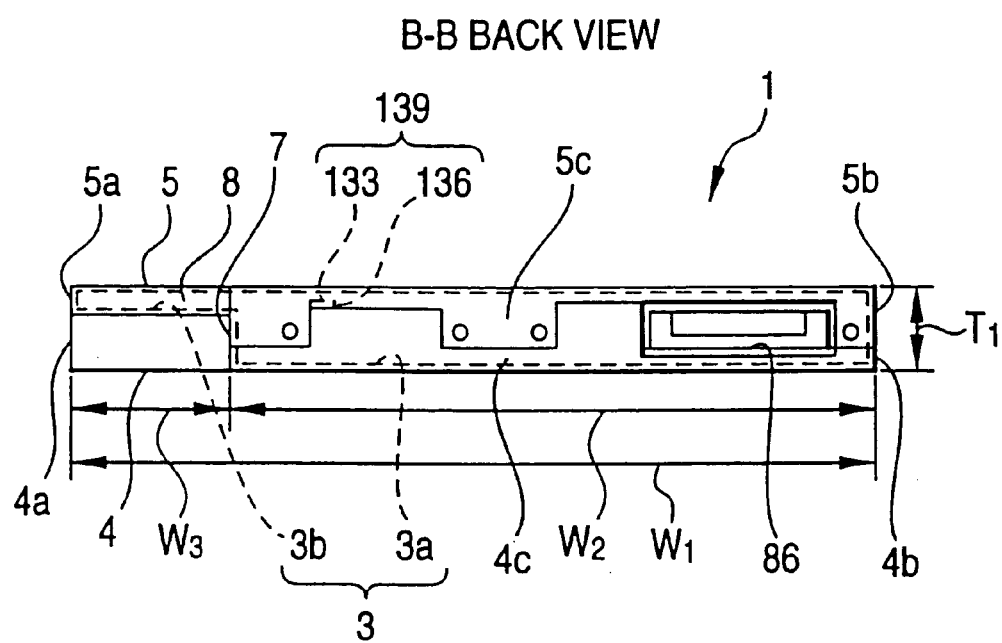
FIG. 6 is a back view of the optical disc drive as viewed according to arrows B in FIG. 4.
Figure 7:
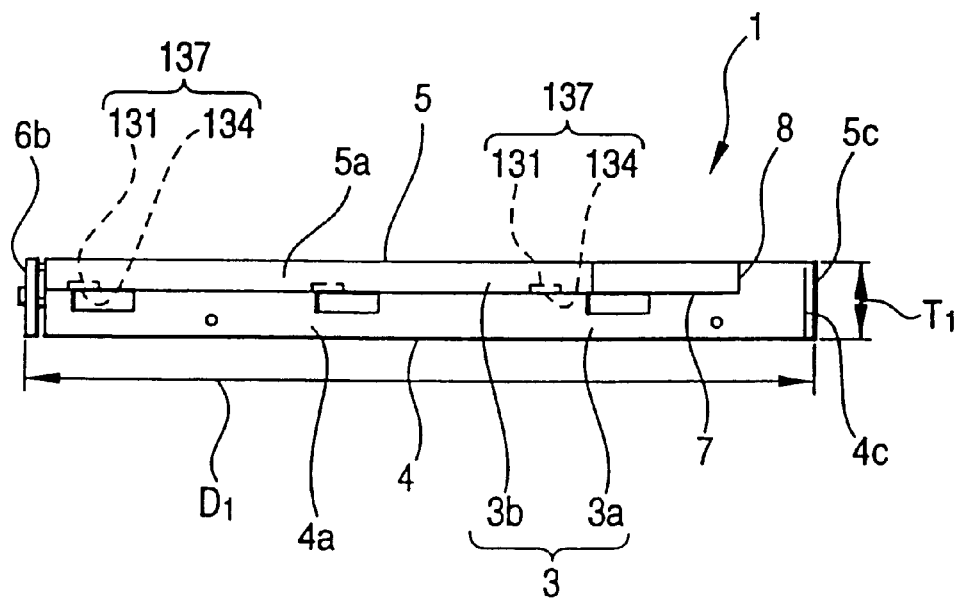
FIG. 7 is a right-hand side view of the optical disc drive as viewed according to arrows C in FIG. 4.
Figure 8:
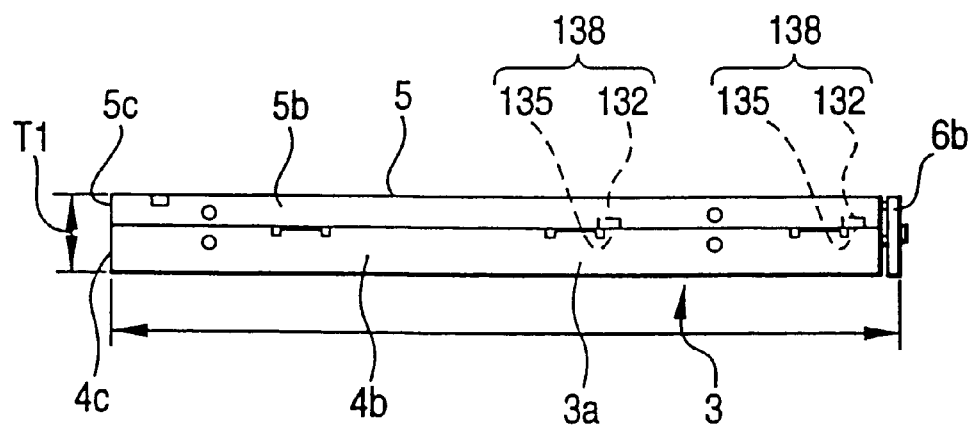
FIG. 8 is a left-hand side view of the optical disc drive as viewed according to arrows D in FIG. 4.

As shown in FIGS. 2, 10, and 18–22, a spindle motor 11 on which the optical disc 2 is to be mounted is mounted vertically on a top portion of the drawer main body 6a of the drawer 6. A disc table 12 is formed levelly at the top end of the rotor of the spindle motor 11. Self-chucking mechanisms 13 are arranged on the top outer circumference of a centering guide 12 a (formed on top of the disc table 12) at positions that divide the circumference into three equal arcs. An optical pickup 15 as a means for performing recording and/or reproduction on the optical disc 2 mounted on the spindle motor 11 is mounted on the drawer main body 6a. The optical pickup 15 is provided with an objective lens 16 for applying a laser beam to the optical disc 2 perpendicularly from below while focusing it and a carriage 18 that is mounted with the objective lens, its biaxial actuator, and an optical system for emitting a laser beam and receiving a reflection beam. The spindle motor 11 i disposed at a position that is approximately at the center in the front-rear direction of the drawer main body 6a and approximately at the center $P_1$ in the width direction of the drive main body 3. The objective lens 16 of the optical pickup 15 is deviated from the spindle motor 11 to the front panel 4b side and moved by the carriage 18 in the directions indicated by arrows c and d along a scanning path $P_2$ that is inclined from the width direction. The top surface of the drawer main body 6a is formed levelly with a circular recess 6c that is a little greater than the diameter D of the optical disc 2 and has the spindle motor 11 as its center. The disc table 12 and the objective lens 16 are provided on the bottom surface side of the recess 6c. The recess 6c serves as a disc mounting portion. As shown in FIGS. 2 and 3, the front panel 6b is provided with an LED 6d, an ejection button 6e, an emergency hole 6f, etc.

Figure 19:
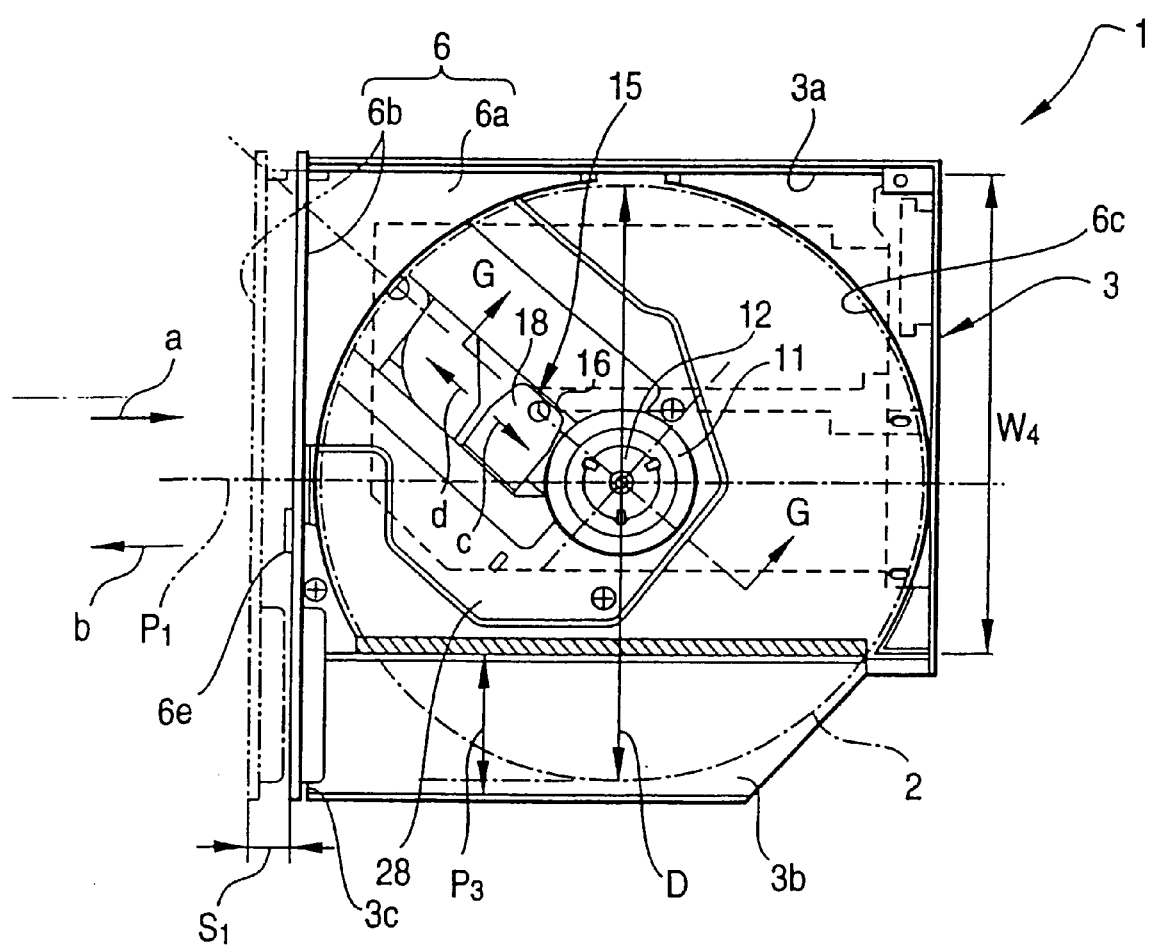
FIG. 19 is a plan view of the optical disc drive of FIG. 2 in a state that the drawer is inserted in the drive main body and the top cover is removed.
Figure 20:
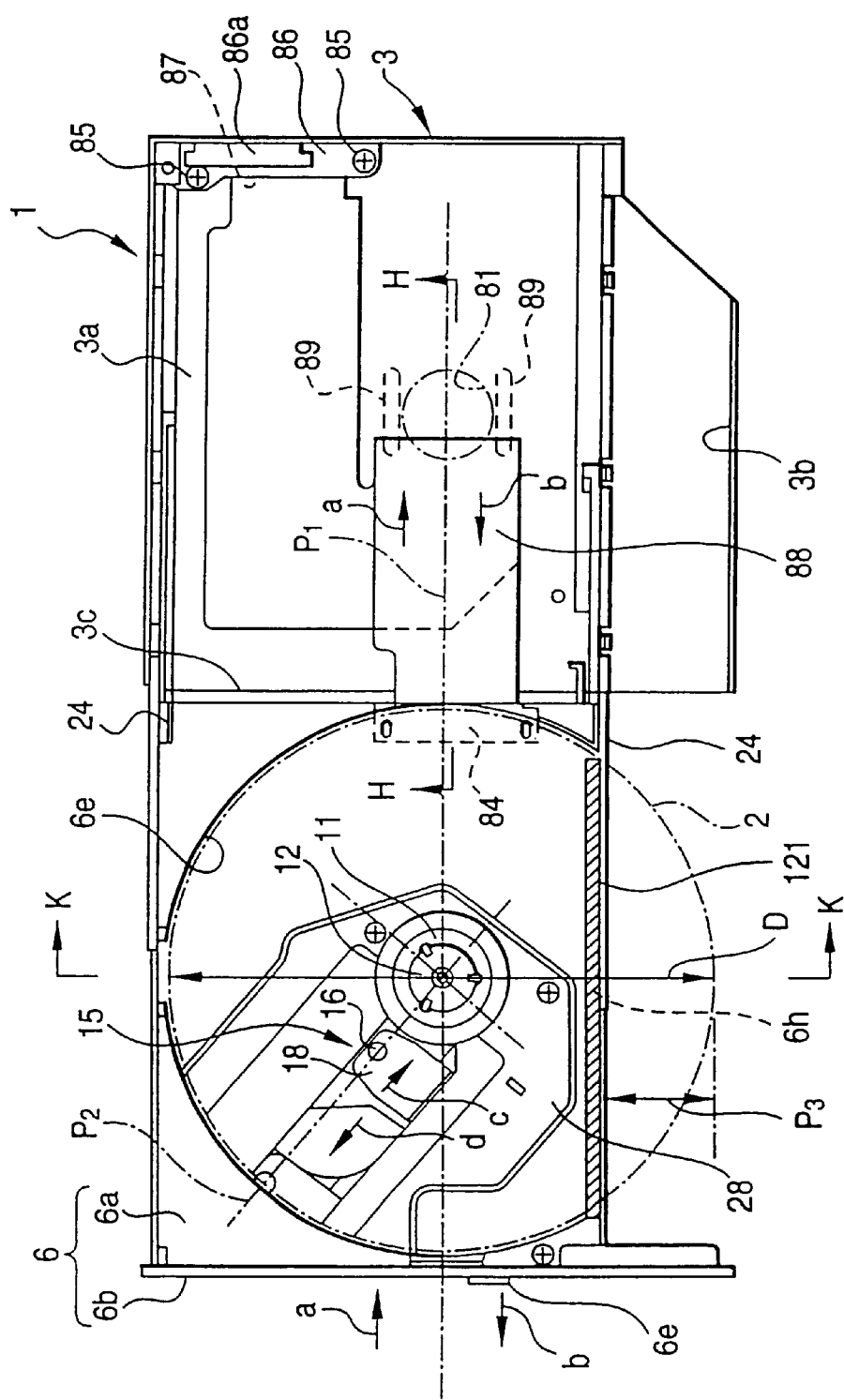
FIG. 20 is a plan view of the optical disc drive of FIG. 2 in a state that the drawer is completely drawn out of the drive main body and the top cover is removed.
Figure 21:
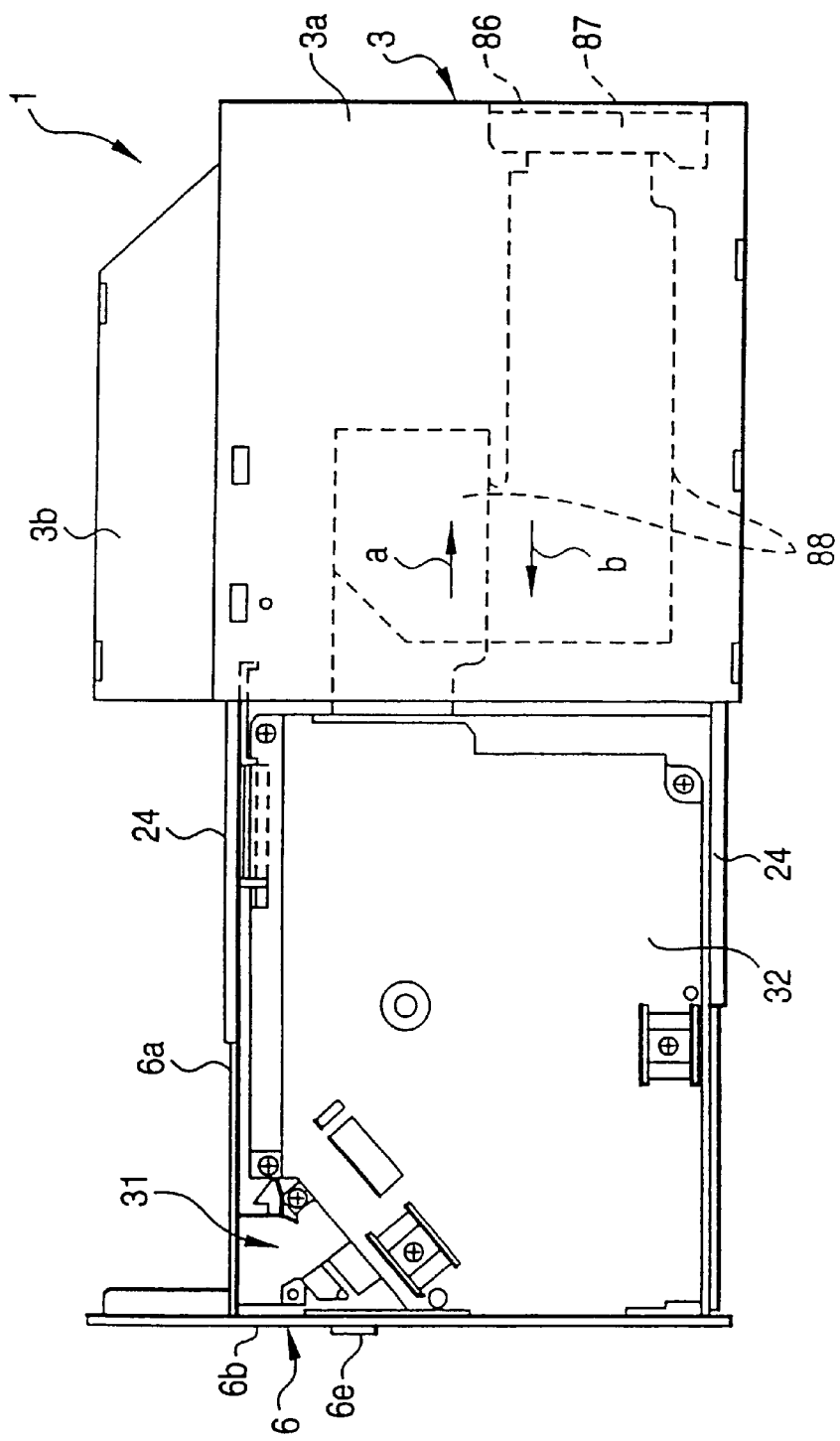
FIG. 21 is a bottom view of the drive main body corresponding to FIG. 20.
Figure 22:
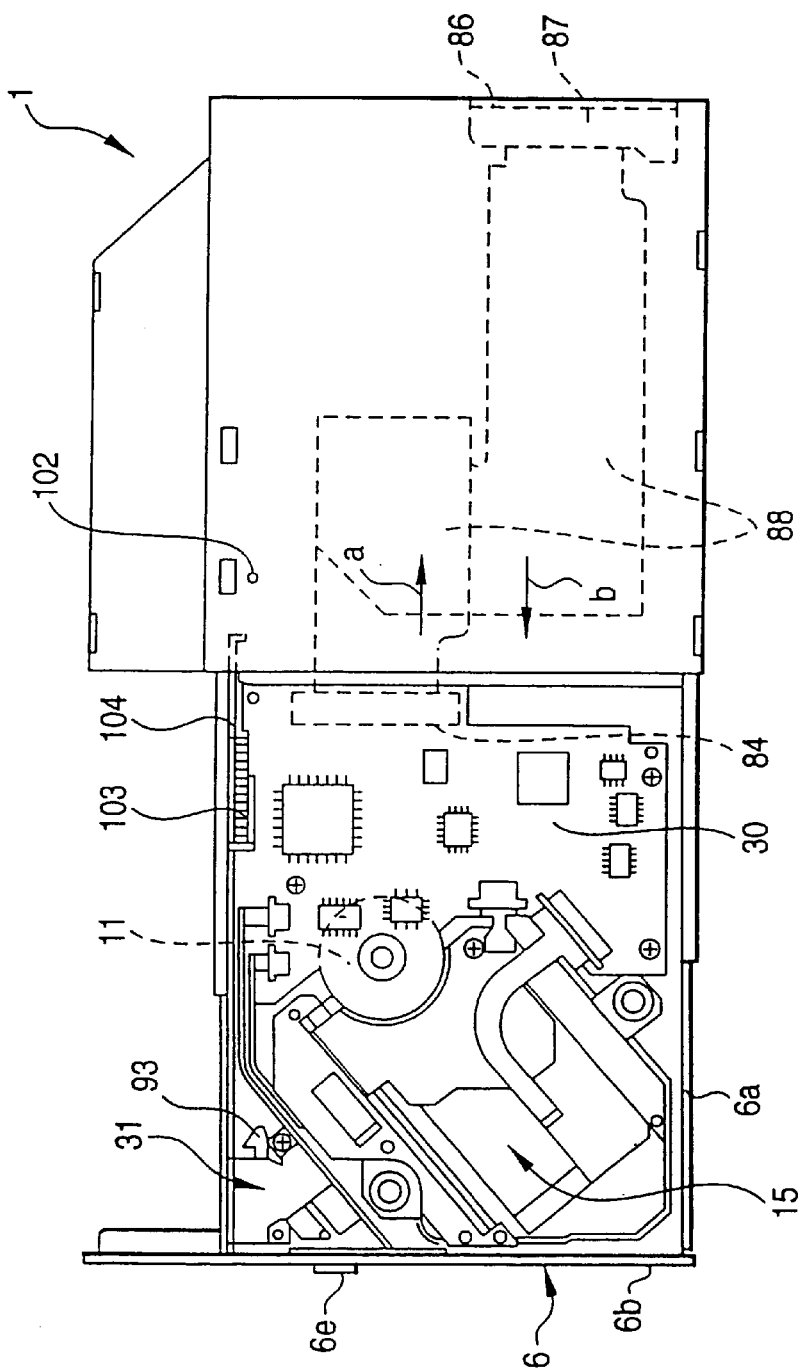
FIG. 22 is a bottom view of the drive main body corresponding to FIG. 20 in which the shield plate is removed.
Figure 23:
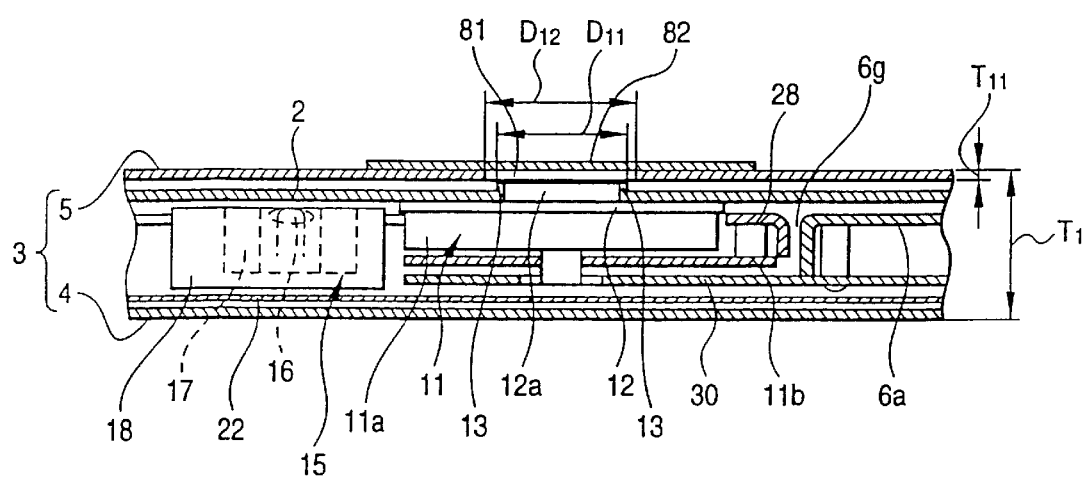
FIG. 23 is an enlarged sectional view taken along line G—G in FIG. 19 and illustrating how the drive main body of the optical disc drive of FIG. 2 is thinned.
Figure 25:
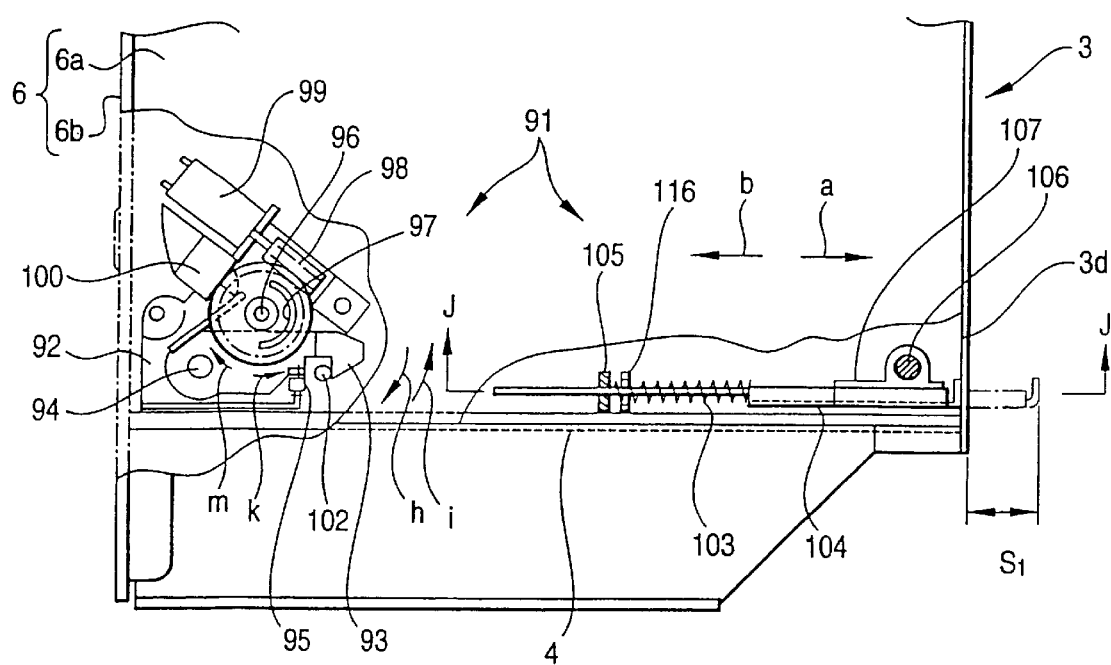
FIG. 25 is a partially cutaway top view illustrating a drawer lock and ejection mechanism of the optical disc drive of FIG. 2.

The optical disc drive 1 has been outlined above. As shown in FIGS. 2 and 20, after the user has pulled out the drawer 6 from the drive main body 3 in the direction indicated by arrow b with his hand, he attaches the optical disc 2 to the outer circumference of the centering guide 12a (self-chucking) and mounts it levelly on the disc table 12 so that the optical disc 2 is accommodated levelly in the recess 6c. At this time, the optical disc 2 is self-chucked so that the right-hand portion of the optical disc 2 come out of the drawer main body 6a rightward by a projection length $P_3$ that is smaller than about ¼ of the diameter D of the optical disc 2. Then, the user pushes the drawer 6 into the drive main body 3 in the direction indicated by arrow a by pressing the front panel 6b with his hand as shown in FIGS. 3 and 19, whereby the drawer main body 6a is inserted levelly into the small width portion 3a (i.e., the lower portion) of the drive main body 3 and the optical disc 2 is inserted levelly into the large width portion 3b (i.e., the upper portion) through the front opening 3c. When the insertion of the drawer 6 into the drive main body 3 in the direction indicated by arrow a has been completed, that is, when the front panel 6b has closed the front opening 3c of the drive main body 3, the drawer 6 is locked on the drive main body 3 by means of a drawer lock and ejection mechanism (described later).

Thereafter, the spindle motor 11 is driven in accordance with a recording or reproduction instruction signal that is sent from a host computer, whereby the optical disc 2 is rotated at high speed. The objective lens 16 of the optical pickup 15 is moved (seek and tracking) by the carriage 18 in the directions indicated by arrows c and d while focusing a laser beam and applying it to the optical disc 2 from below, whereby data is recorded onto or reproduced from the optical disc 2. Then, when the user depresses the ejection button 6e after the recording or reproduction of the optical disc 2, the drawer 4 is automatically pushed out from the drive main body 3 in the direction indicated by arrow b by a stroke $S_1$ by means of the lock and ejection mechanism (described later) as shown in chain lines in FIG. 19. Thereafter, the user can easily pull out the drawer 4 with his hand in the direction indicated by arrow b.

(2) Outline of Drive Main Body Internal Configuration

Figure 9:
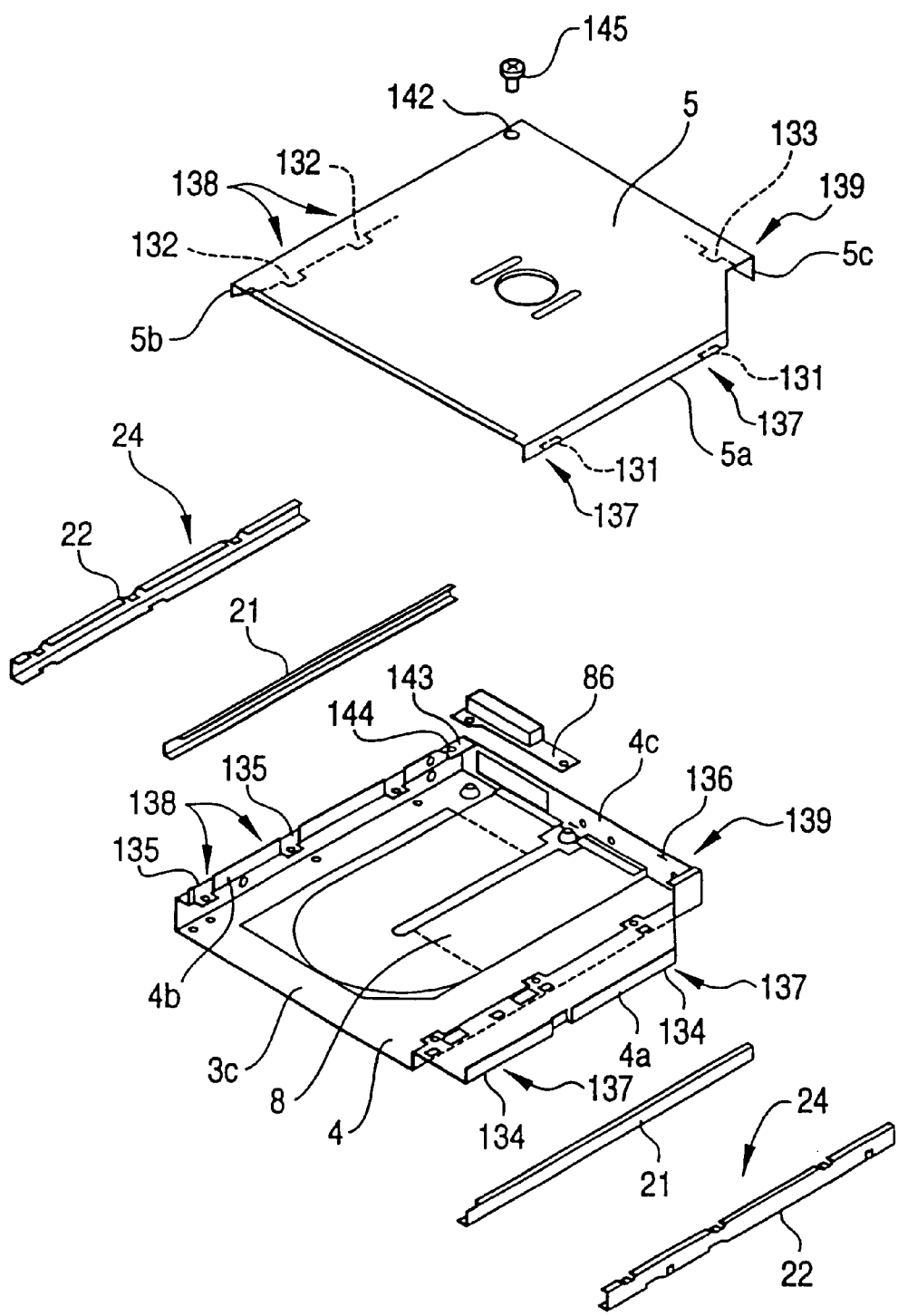
FIG. 9 is an exploded perspective view showing a top cover, a bottom chassis, and guide rails of the optical disc drive of FIG. 2.
Figure 10:
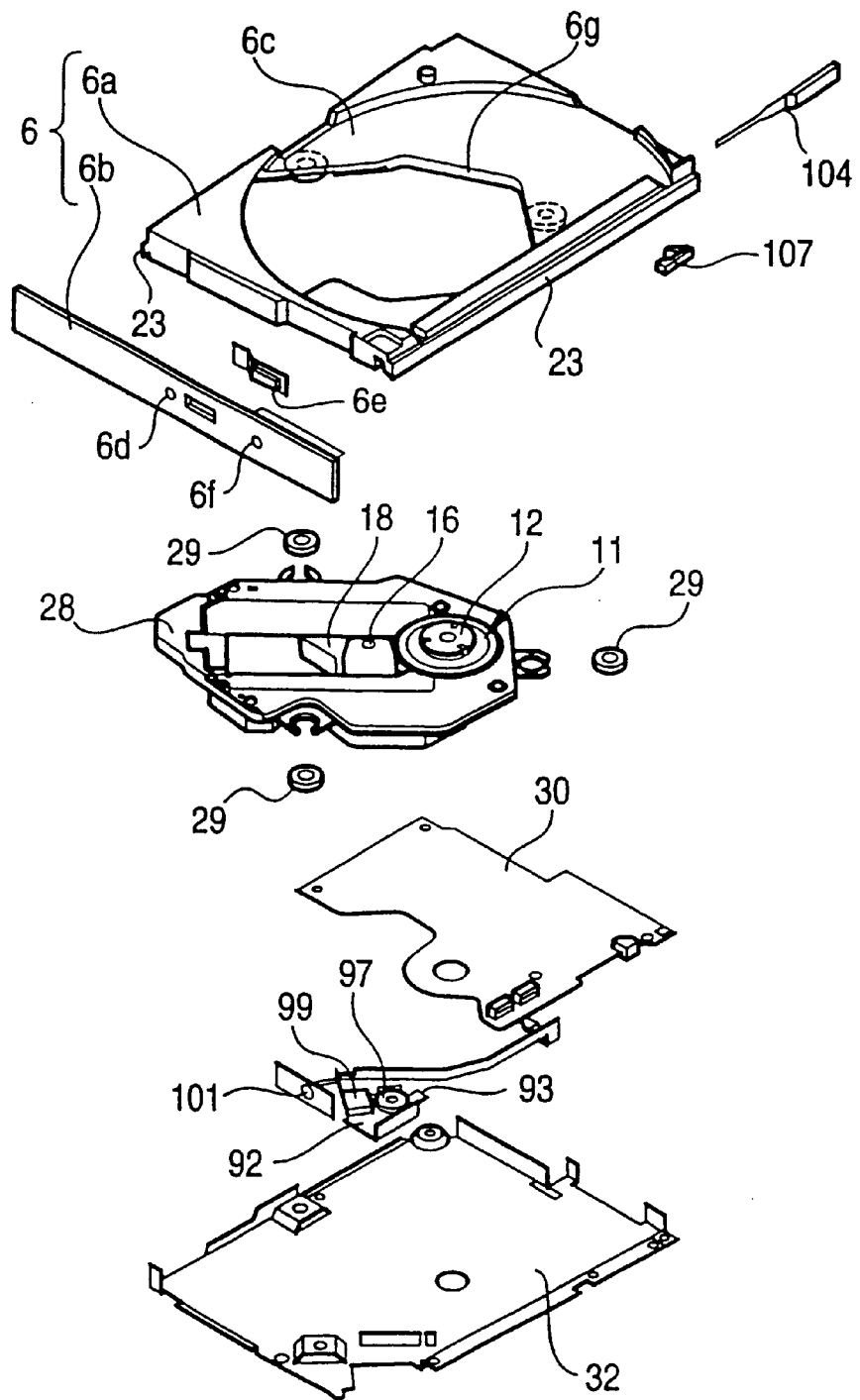
FIG. 10 is an exploded perspective view showing a drawer, an optical pickup, a main circuit board, a shield plate, and a drawer lock and ejection mechanism of the optical disc drive of FIG. 2.
Figure 11:
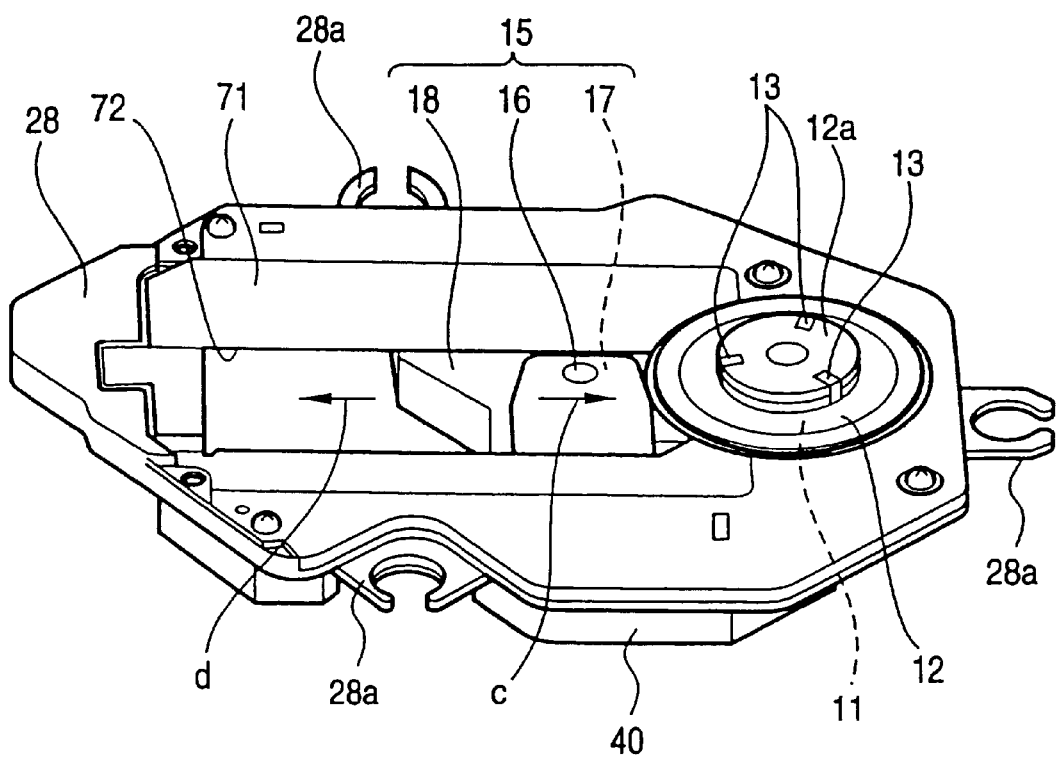
FIG. 11 is a perspective view of the optical disc drive of FIG. 2 to which a spindle motor and the optical pickup are attached.
Figure 12:
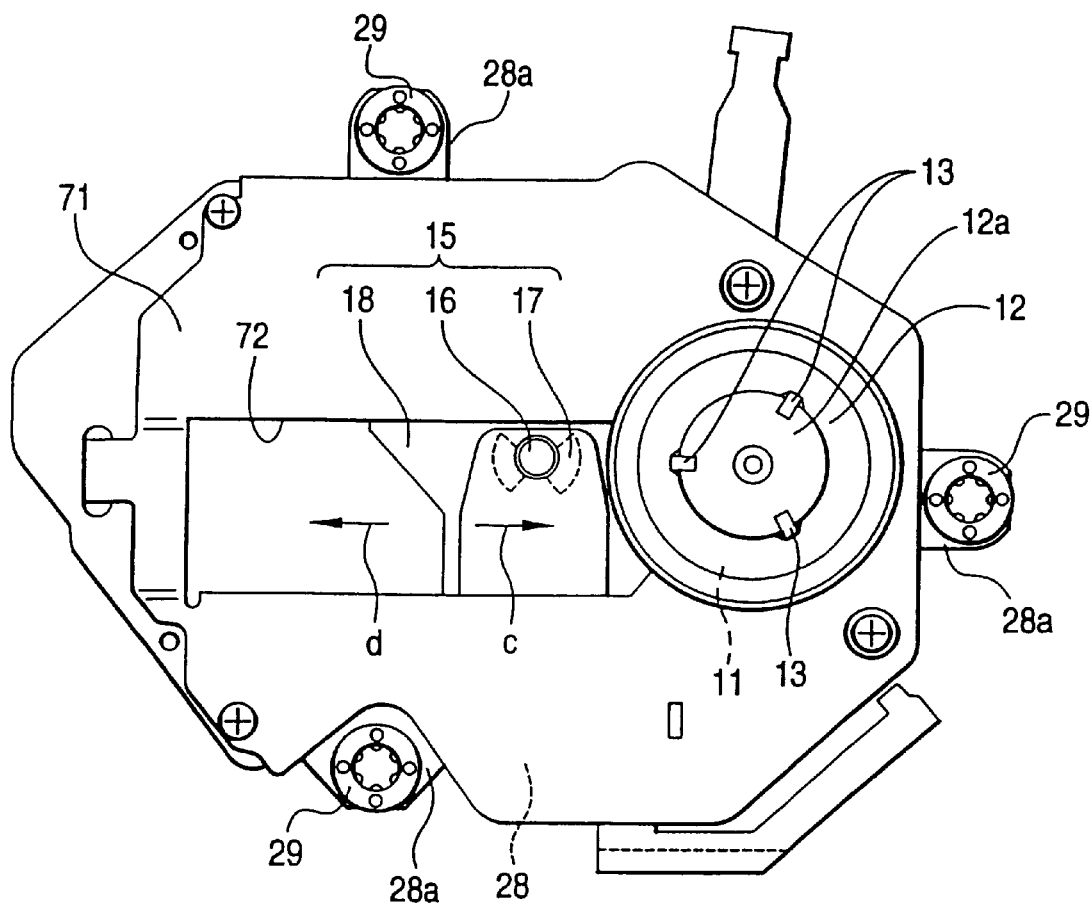
FIG. 12 is a top view corresponding to FIG. 11.
Figure 13:
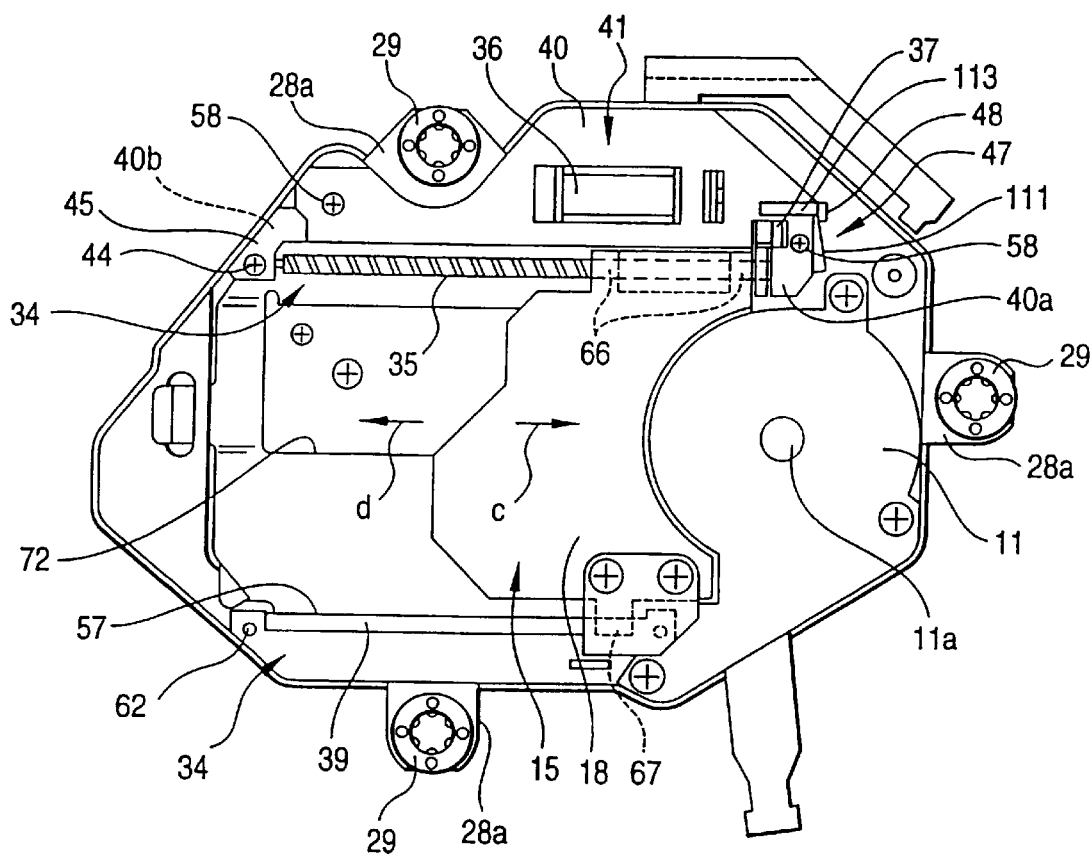
FIG. 13 is a bottom view corresponding to FIG. 11.
Figure 14:
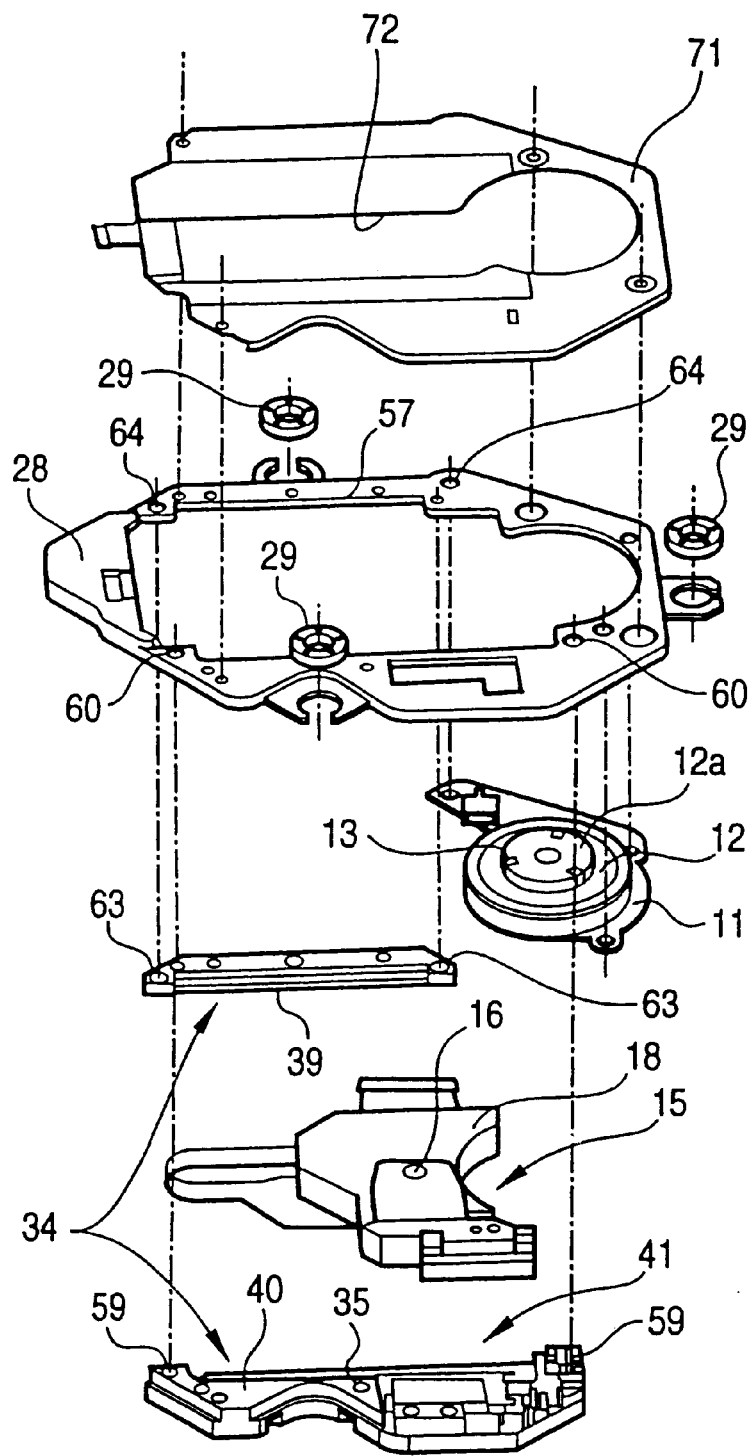
FIG. 14 is an exploded perspective view corresponding to FIG. 11.
Figure 15:
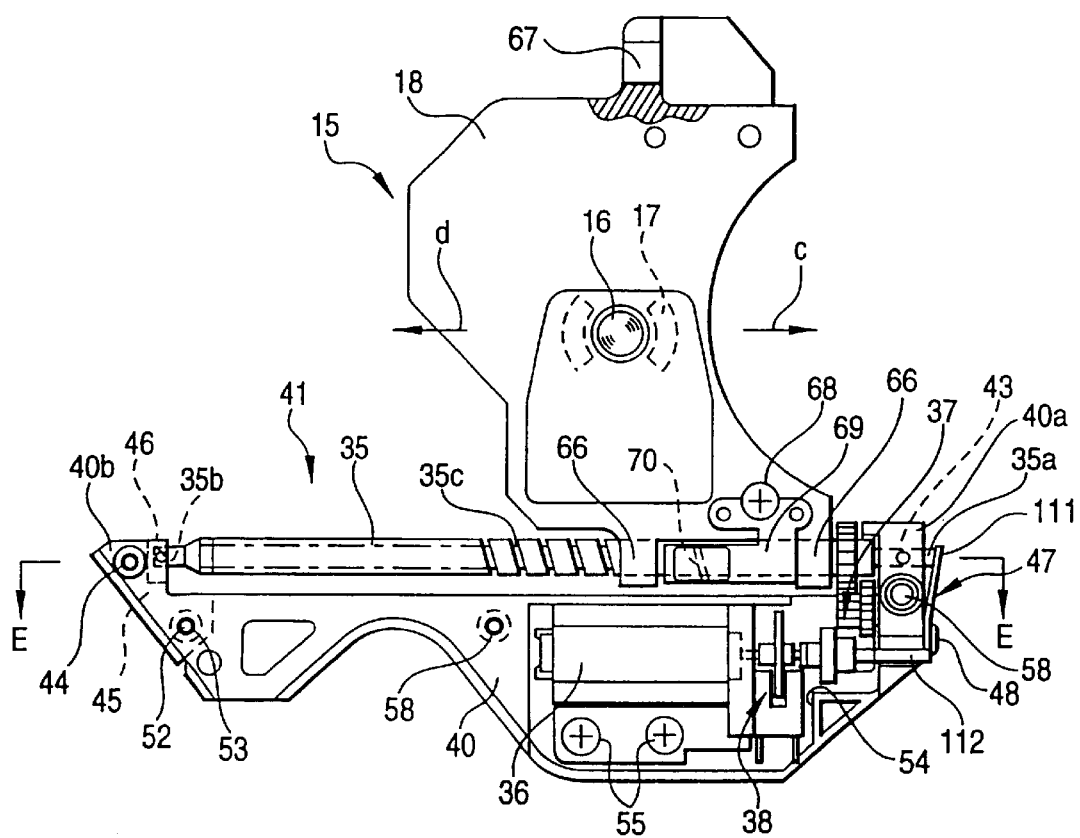
FIG. 15 is a top view of a carriage transport mechanism unit of the optical disc drive of FIG. 2.
Figure 16:
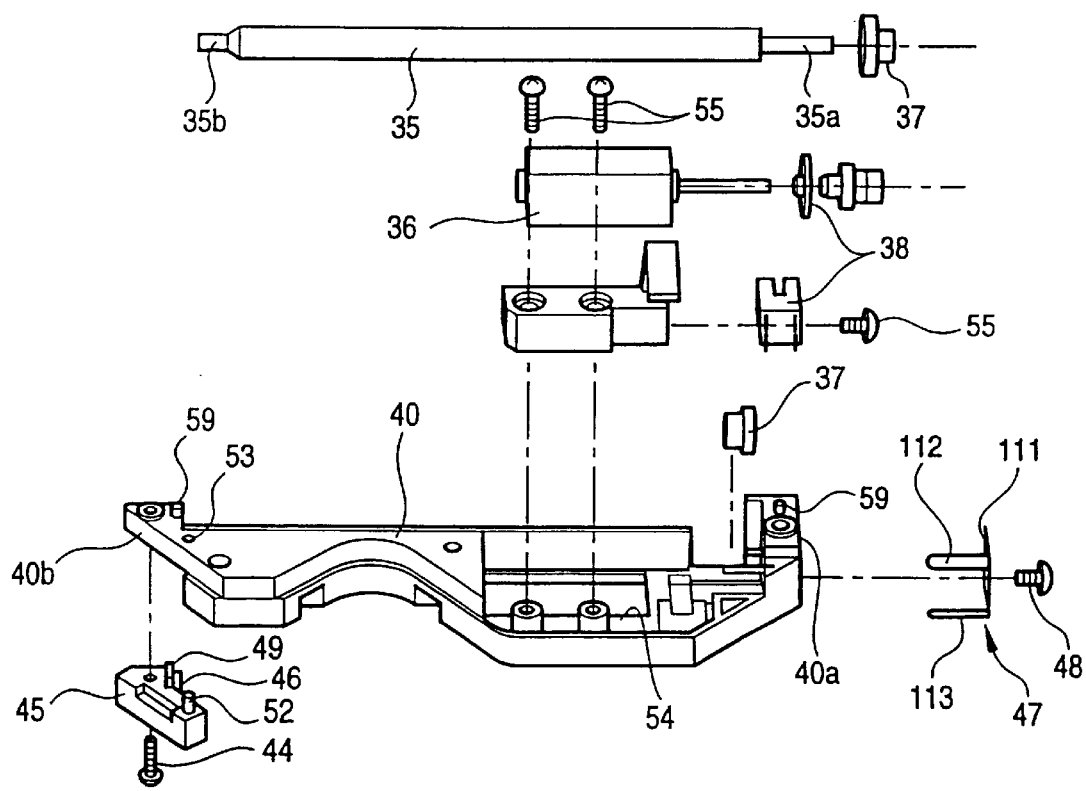
FIG. 16 is an exploded perspective view of the carriage transport mechanism of FIG. 15.
Figure 17:
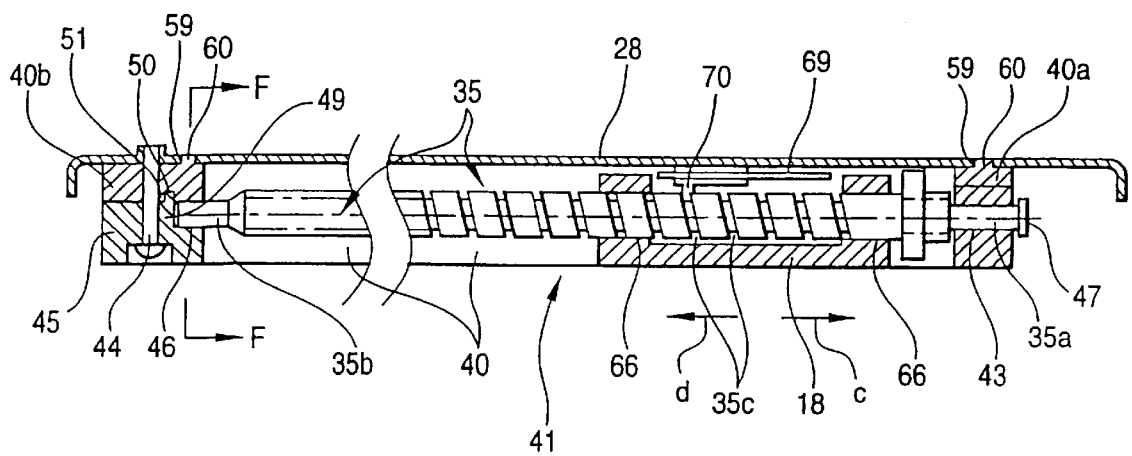
FIG. 17(A) is an enlarged sectional view taken along line E—E in FIG. 15.
FIG. 17(B) is a sectional view taken along line F—F in FIG. 7(A)
Figure 17:
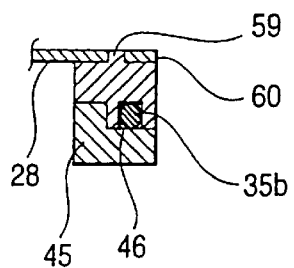

Next, the internal configuration of the drive main body 3 will be described with reference to FIGS. 9 and 10. Double, that is, inside and outside, guide rails 21 and 22 that have approximately bracket-like shearing surface shapes and assembled so as to be slidable with respect to each other are incorporated in the small width portion 3a of the drive main body 3 at each of the right and left side positions so that the two sets of guide rails 21 and 22 are symmetrical with respect to the vertical center line and slidable in the directions indicated by arrows a and b. The pair of, that is, right and left, outside guide rails 22 are fixed to the inside surfaces of the drive main body 3 by means of a plurality of bent pieces 25 of the bottom chassis 4. A pair of, that is, right and left, guide rails 23 that are formed integrally with the right-hand and left-hand side portions of the drawer main body 6a are incorporated in the pair of, that is, right and left, inside guide rails 21 so as to be slidable in the directions indicated by arrows a and b. A guide rail mechanism 24 capable of extension and contraction is formed by the pairs of guide rails 21, 22, and 23, and makes it possible to insert and draw the drawer 6 levelly into and out of the drive main body 3 in the directions indicated by arrows a and b.

The spindle motor 11 and the optical pickup 15 are mounted on a unit chassis 28 made of sheet metal (spindle motor 11 and optical pickup 15 mounting chassis). The unit chassis 28 is inserted, with a gap (play), in an opening 6g that is formed in the bottom portion of the recess 6c of the drawer main body 6a. The unit chassis 28 is screwed on the drawer main body 6a from below in a detachable manner via a plurality of insulators 29 that are attached to the outer circumference of the unit chassis 28. The plurality of insulators 29 allow the spindle motor 11 and the optical pickup 15 to float on the drawer main body 6a in terms of vibration. A main circuit board 30 and a drawer lock and ejection mechanism 31 are attached to the bottom portion of the drawer main body 6a with screws or by some other means in a detachable manner so not to contact the unit chassis 28. A shield cover 32 made of thin sheet metal, which electrically shields the spindle motor 11, the optical pickup 15, the main circuit board 30, etc. from below, are screwed on the bottom portion of the drawer main body 6a in a detachable manner.

(3) Carriage Transport Mechanism Unit

Next, a carriage transport mechanism unit will be described with reference to FIG. 11 to FIGS. 17(A)–17(B).

A carriage transport mechanism 34 for moving the objective lens 16 (recording and/or reproducing means) of the optical pickup 15 in the directions indicated by arrows c and d is composed of a lead screw 35 that also serves as a guide main shaft, a driving motor 36 therefor, a transmission system 37 consisting of a plurality of gears that are disposed between the motor 36 and the lead screw 35, and an encoder 38 for detecting the rotation position of the motor 36, a guide auxiliary shaft 39, and other parts.

A carriage transport mechanism unit 41 is formed by attaching those parts of the plurality of mechanism parts of the carriage transport mechanism 34 which exclude the guide auxiliary shaft 39, that is, the lead screw 35, the motor 36, the transmission system 37, the encoder 38, etc., to a one-piece unit base 40 (rendering those parts a unit).

A more specific description will be given below. The unit base 40 is molded with a synthetic resin or the like. One end 35a of the lead screw 35 is detachably inserted in and rotatably supported by a bearing 43 that is a cylindrical hole formed at one end 40a of the unit base 40 as a result of insertion in the axial direction (i.e., the direction indicated by arrow c). The other end 35b of the lead screw 35 is supported detachably and rotatably by a lead screw detachment member 45 that is detachably fixed to the other end 40b of the unit base 40 with set screws 44 from below. A bearing 46 that is a prism-shaped hole and can be divided in the direction perpendicular to the axial direction is formed between the end 40b of the unit base 40 and the lead screw detachment member 45. The end 35b of the lead screw 35 is supported by the bearing 46 detachably and rotatably.

A pressurizing spring 47 (thrust pressurizing means) that is a metal leaf spring is detachably fixed, with a set screw 48, to the outside of the bearing 43 on the end 40a side of the unit base 40. The pressurizing spring 47 elastically presses the end 35a of the lead screw 35 in the axial direction (i.e., the direction indicated by arrow d), whereby the end 35b of the lead screw 35 is elastically pressed in the direction indicated by arrow d against a thrust receiving member 49 that is formed in the lead screw detachment member 45. To securely receive the resilient force of the pressurizing spring 47 by the end 40b of the unit base 40, a rib 50 that is formed integrally with the end 40b and the lead screw detachment member 45 in between is detachably fitted in a rib fitting groove 51 as a result of insertion in the direction perpendicular to the axial direction of the lead screw 35. To facilitate an operation of detaching the lead screw 35 by means of the lead screw detachment member 45, a dowel 52 that is formed integrally with the lead screw detachment member 45 is weakly press-fitted in a dowel hole 53 that is formed in the end 40b of the unit base 40 and a positioning function by the fitting of the rib 50 and the rib fitting hole 51 is provided.

The motor 36, the transmission system 37, the encoder 37, etc. are inserted in a plurality of recesses 54 that are formed in the unit base 40 and fixed to the unit base 40 by a plurality of set screws 55, support shafts (not shown), etc. with an exception that the final stage gear of the transmission system 37 is fixed to the outer circumference of the end 35a of the lead screw 35 by press fitting or the like.

The unit base 40 of the carriage transport mechanism unit 41 is attached to the bottom surface of the unit chassis 28 in a detachable manner with a plurality of set screws 58 on one side of the opening 57 of the unit chassis 28. Positioning is effected by fitting a pair of dowels 59 that are formed integrally with the respective ends 40a and 40b of the top portion of the unit base 40 in a pair of dowel holes 60 that are formed in the unit chassis 28.

The guide auxiliary shaft 39 made of a synthetic resin or the like is detachably fixed to the bottom surface of the unit chassis 28 with a plurality of set screws 62 on the other side of the opening 57 so as to be parallel with the lead screw 35. As in the case of the unit base 40, the guide auxiliary shaft 39 is positioned by fitting a pair of dowels 63 that are formed on its top surface integrally with it in a pair of dowel holes 64 that are formed in the unit chassis 28.

The lead screw 35 is detachably inserted in a pair of thrust bearings 66 that are cylindrical holes and formed at one end of the carriage 18 that is mounted with the objective lens 16 of the optical pickup 15 as a result of insertion in the axial direction. The guide auxiliary shaft 39 is detachably inserted in a U-shaped groove 67 that is formed at the other end of the carriage 18 as a result of insertion in the direction perpendicular to the axial direction. A needle 70 molded with a synthetic resin is supported by a metal leaf spring 69 that is detachably fixed to one end of the carriage 18 with a set screw 68. The resilient force of the leaf spring 69 causes the needle 70 to engage a spiral screw groove 35c that is formed on the outer circumference of the lead screw 35.

The entire carriage transport mechanism 34 is attached to the unit chassis 28 as described above. By controlling the rotation of the lead screw 35 in both normal and reverse directions by the motor 36 via the transmission system 37, the lead groove 35c drives the needle 70 and the carriage 18 can thereby be moved in the directions indicated by arrows c and d between the lead screw 35 that also serves as the guide main shaft and the guide auxiliary shaft 39. A chassis cover 71 made of thin sheet metal is screwed on the top surface of the unit chassis 28. The objective lens 16 that is mounted on the carriage 18 is exposed above through an opening 72 that is formed in the chassis cover 71.

If the above-described scheme is employed in which the carriage transport mechanism unit 41 is produced by rendering the carriage transport mechanism a unit and the unit base 40 of the carriage transport mechanism unit 41 is attached, in a detachable manner, to the unit chassis 28 that is to be mounted with the spindle motor 11 and the optical pickup 15, it becomes possible to complete the attachment of all mechanism parts of the carriage transport mechanism 34 such as the lead screw 35, the motor 36, the transmission system 37, the encoder 38, the lead screw detachment member 45, and the pressurizing spring 47 to the unit base 40 and all of the load adjustment among those mechanism parts and other operations in the initial assembling step executed by a subcontractor, for example. The complete carriage transport mechanism unit 41 that has already been subjected to the load adjustment and other operations may be brought to the final step of a manufacturing line of a major manufacturer or the like for assembling a set, that is, an optical disc drive 1. In this case, in the final assembling step, the load adjustment among the mechanism parts and other operations can be omitted and the only operation needed is to attach the unit base 40 of the carriage transport mechanism unit 41 to the unit chassis 28. As a result, the productivity is greatly increased and hence the cost can be reduced.

In this case, it is necessary to attach the unit base 40 to the unit chassis 28 and cause the carriage 18 to bridge the lead screw 35 and the guide auxiliary shaft 39. In doing so, the end 35a of the lead screw 35 can easily be removed from the bearing 43 of the unit base 40 in the axial direction (i.e., the direction indicated by arrow d) simply by removing only the lead screw detachment member 45 and thereby freeing the other end 35b of the lead screw 35. Thereafter, the carriage 18 can be attached very easily merely by inserting the lead screw 35 into the pair of bearings 66 of the carriage 18 in the axial direction, re-inserting the end 35a of the lead screw 35 into the bearing 43 of the unit base 40 in the axial direction (i.e., the direction indicated by arrow c), and re-attaching the other end 35b of the lead screw 35 to the bearing 46 of the unit base 40 by using the lead screw detachment member 45.

As described above, with the carriage transport mechanism unit 41, the assembling or disassembling relating to the carrier 18 can be performed very easily merely by attaching or detaching the lead screw detachment member 45. Therefore, the load reduced state that has been established by the adjustment in the initial assembling step can be kept almost as it is in the final assembling step. Therefore, the load adjustment step in the final assembling step can substantially be eliminated. As a result, the load dispersion among the mechanism parts can be reduced and the load in feeding the carriage 18 in the directions indicated by arrows c and d can be stabilized, whereby high reliability can be secured.

The carriage 18 can be attached to and detached from the lead screw 35 in the axial direction and can be inserted into and removed from the U-shaped groove 67 of the guide auxiliary shaft 39 in the direction perpendicular to the axial direction. Therefore, the carriage 18 can be attached or detached very easily merely by attaching or detaching it to or from the lead screw 35 by attaching or detaching only the lead screw detachment member 45 in a state that the unit base 40 and the guide auxiliary screw 39 are kept fixed to the unit chassis 28. Therefore, the replacement or the like of the optical pickup 15 can be performed very easily.

(4) Skew Adjustment Mechanism

Figure 18:
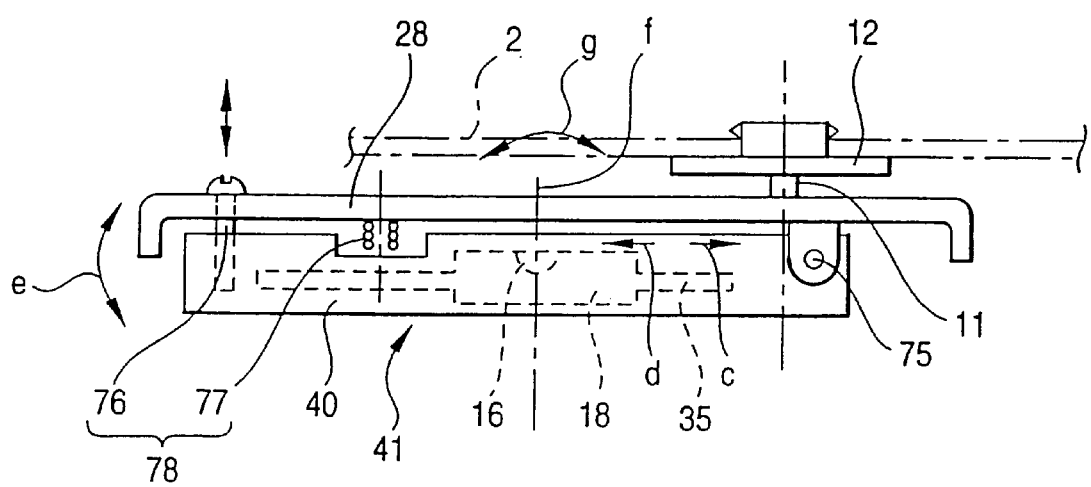
FIG. 18 is a side view showing a skew adjustment mechanism that is an advanced version of the carriage transport mechanism unit of FIG. 15.

Next, a skew adjustment mechanism that is an advanced version of the carriage transport mechanism 41 will be described with reference to FIG. 18.

A skew adjustment mechanism 79 can easily be realized merely by rotatably attaching, by means of a hinge 75, one end 40a of the unit base 40 to the unit chassis 28 that is mounted with the spindle motor 11 and attaching a skew adjustment means 78 consisting of a height adjustment screw 76 and a spring 77 as a unidirectional urging means between the other end 40b of the unit base 40 and the unit chassis 28.

The optical axis f of the objective lens 16 that is mounted on the carriage 18 in which the lead screw 35 is inserted can easily be skew-adjusted in the tangential direction g of the optical disc 2 that is mounted on the spindle motor 11 by rotationally adjusting the unit base 40 with respect to the unit chassis 28 by rotating it around the hinge 75 in the direction indicated by arrow e through cooperation of the height adjustment screw 76 and the spring 77 of the skew adjustment means 78.

(5) Thinning of Drive Main Body

Next, a configuration for accelerating the thinning of the drive main body 3 will be described with reference to FIGS. 2–4 and 19–23.

A circular disc table escape hole 81 is formed in the top cover 5 at the position that is located right above the disc table 12 in a state that the drawer 6 has been pushed into the drive main body 3 in the direction indicated by arrow a and is locked by the drawer lock and ejection mechanism 31 (described later). The diameter $D_{12}$ of the disc table escape hole 81 is made greater than the diameter $D_{11}$ of the circular centering guide 12a including the self-chucking mechanisms 13 that is formed at the top of the disc table 12. The disc table escape hole 81 is closed by sticking a label 82 on the top surface of the top cover 5.

With the above configuration, when the spindle motor 11 that is elastically supported by the drawer main body 6a via the plurality of insulators 29 vibrates in, particularly, the vertical direction, the centering guide 12a including the self-chucking mechanisms 13 of the disc table 12 can escape into the disc table escape hole 81 by utilizing the thickness $T_{11}$ of the top cover 5, to thereby avoid an event that the centering guide 12a hits the top cover 5. This makes it possible to place the disc table 12 very close (about 0.7 mm apart, for example) to the bottom surface of the top cover 5, and to allow the thickness $T_{11}$ of the top cover 5 to fall within the maximum vertical vibration amplitude of the disc table 12. The thickness $T_1$ of the drive main body 3 can be reduced by utilizing the thickness $T_{11}$ of the top cover 5.

Incidentally, as shown in FIG. 19 to FIGS. 24(A)–24(C), a connector 84 is mounted on the rear end (in the direction indicated by arrow a) of the main circuit board 30 that is attached to the bottom portion of the drawer main body 6a and a connector 87 is mounted on an interface circuit board 86 that is fixed to the rear end of the bottom chassis 4 of the drive main body 3 with set screws 85. The two connectors 84 and 87 are connected to each other by a flexible printed circuit board 88 that has a margin in length. The flexible printed circuit board 88 is accommodated in the drive main body 3 so as to assume approximately a U-shape. When the drawer 6 is inserted into or drawn out of the drive main body 3 in the direction indicated by arrow a or b, the flexible printed circuit board 88 is caused to move in the front-rear direction (i.e., the direction indicated by arrow a or b) following the drawer 6 while keeping the U-shaped bent state in the drive main body 3 against its elasticity as indicated by a solid line and chain lines in FIG. 24(A).

In moving in the above manner, the flexible printed circuit board 88 slides in the direction indicated by arrow a or b while being pressed against both of the bottom chassis 4 and the top cover 5 of the drive main body 3 because of its resilient force (restitution). Therefore, where the above-described disc table escape hole 81 is formed in the top cover 5, the flexible printed circuit board 88 would contact an inside edge 81a of the disc table escape hole 81 and would thereby be damaged.

In view of the above, as shown in FIGS. 24(B) and 24(C), two ribs 89 that are parallel with the front-rear direction (i.e., the directions indicated by arrows a and b) that is the sliding direction of the flexible printed circuit board 88 are formed by drawing on the bottom surface of the top cover 5 on the right and left sides of the disc table escape hole 81 of the top cover 5. The bottom surfaces 89a of the two ribs 89 are rounded.

With this structure, when the flexible printed circuit board 88 slides in the direction indicated by arrow a or b while being pressed against the bottom surface of the top cover 5, in the region of the disc table escape hole 81 the flexible printed circuit board 88 touches the two ribs 89 and a space is thereby secured under the disc table escape hole 81. As a result, the flexible printed circuit board 88 is prevented from being damaged by contacting the bottom edge 81a of the disc table escape hole 81. The durability of the flexible printed circuit board 88 can be improved and the high performance and the high reliability of the optical disc drive 1 can be secured.

(6) Drawer Lock and Ejection Mechanism

Next, a drawer lock and ejection mechanism for locking and ejecting the drawer 6 in and from the drive main body 3 will be described with reference to FIGS. 10, 19, 25, and 26.

A drawer lock and ejection mechanism 91 is screwed on one side portion of the bottom portion of the drawer main body 6a that is close to the front panel 6b. A lock lever 93 is attached to an ejection base 92 so as to be rotatable around a supporting pin 94 in the right-left direction (i.e., the directions indicated by arrows h and i). The lock lever 93 is rotationally urged in the direction of arrow h by a lock spring 95 (rotational urging means), and rotationally driven in the direction of arrow i by a cam gear 97 that is attached rotationally to the ejection base 92 via a support shaft 96. An ejection motor 99 for rotationally driving the cam gear 97 via a worm 98 and a switch 100 for detecting the rotation position of the cam gear 97 are attached to the ejection base 92. An ejection switch 101, which is to be manipulated by an ejection button 6e, is incorporated in the front end surface of the drawer main body 6a. The ejection motor 99 is actuated by the ejection switch 101. The lock lever 93 can be engaged with and disengaged from, in the directions indicated by arrows h and i, respectively, a lock pin 102 that is attached perpendicularly to one side portion of the bottom chassis 4 of the drive main body 3.

An ejection spring 103 that is a compression coiled spring and an ejection slider 104 that is inserted in the ejection spring 103 are attached to one side portion of the drawer main body 6a at a rear-bottom position so as to extend in the front-rear direction (i.e., the directions indicated by arrows a and b). The ejection slider 104 can slide in the directions of arrows a and b being guided by a guide rib 105 that is formed integrally with the bottom portion of the drawer main body 6a and a slide guide 107 that is fixed to it with a set screw 106. The ejection slider 104 is slide-urged by the ejection spring 103 in the direction of arrow a.

With the above drawer lock and ejection mechanism 91, when insertion of the drawer 6 into the drive main body 3 in the direction of arrow a has completed as indicated by solid lines in FIG. 19, the ejection slider 104 hits the rear end portion 3d of the drive main body 3 and is thereby pushed relatively in the direction of arrow b, whereupon the ejection slider 104 compresses the ejection spring 103 to charge it with ejection force. Approximately at the same time, the lock lever 93 goes over the lock pin 102 in the direction of arrow a against the urging force of the lock spring 95 and is thereby engaged with the lock pin 102 in the direction of arrow h by the lock spring 95. In this manner, the drawer 6 is automatically locked in the drive main body 3.

If the user pushes the ejection button 6e of the drawer 6 after completion of recording or reproduction of the optical disc 2, the ejection switch 101 is turned on, whereupon the ejection motor 99 is rotationally driven in the normal direction and the cam gear 97 is rotated in the direction of arrow k via the worm 98. The cam gear 97 rotates the lock lever 93 in the direction of arrow i against the urging force of the lock spring 95, whereby the lock lever 93 is disengaged from the lock pin 102. Then, the ejection slider 104 is pushed out in the direction of arrow a by the ejection force with which the ejection spring 103 has been charged, and resulting restitution causes the drawer 6 to be pushed out automatically from the drive main body 3 to the position indicated by chain lines in FIG. 19. In addition, if the rotation position of the cam gear 97 is thereafter detected by the switch 100, the ejection motor 99 is rotationally driven in the reverse direction and the cam gear 97 is thereby rotated in the direction of arrow m and returned to the original position. The lock of the lock lever 93 can also be cancelled by a wire or the like that is inserted through the emergency hole 6f of the front panel 6b.

(7) Grounding Method of Carriage etc.

Figure 26:
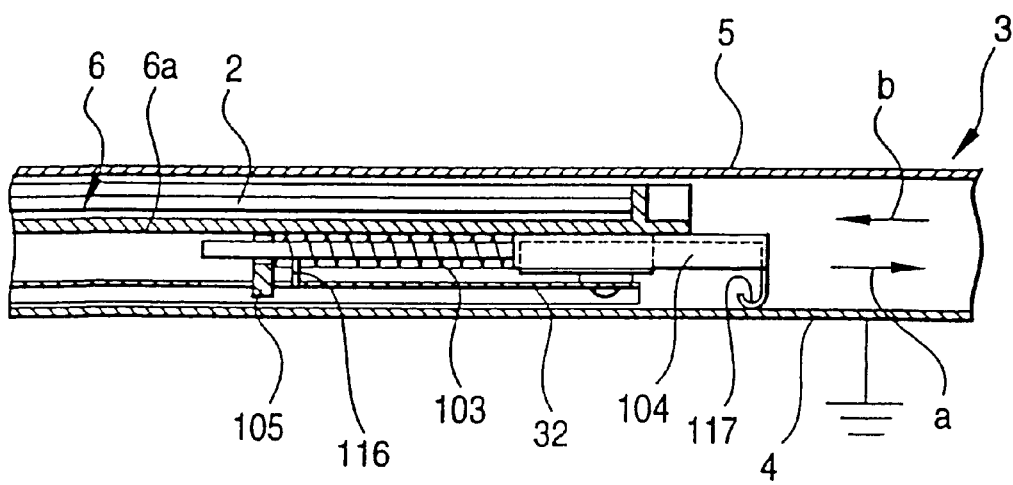
FIG. 26 is a sectional view taken along line J—J in FIG. 25.
Figure 27:
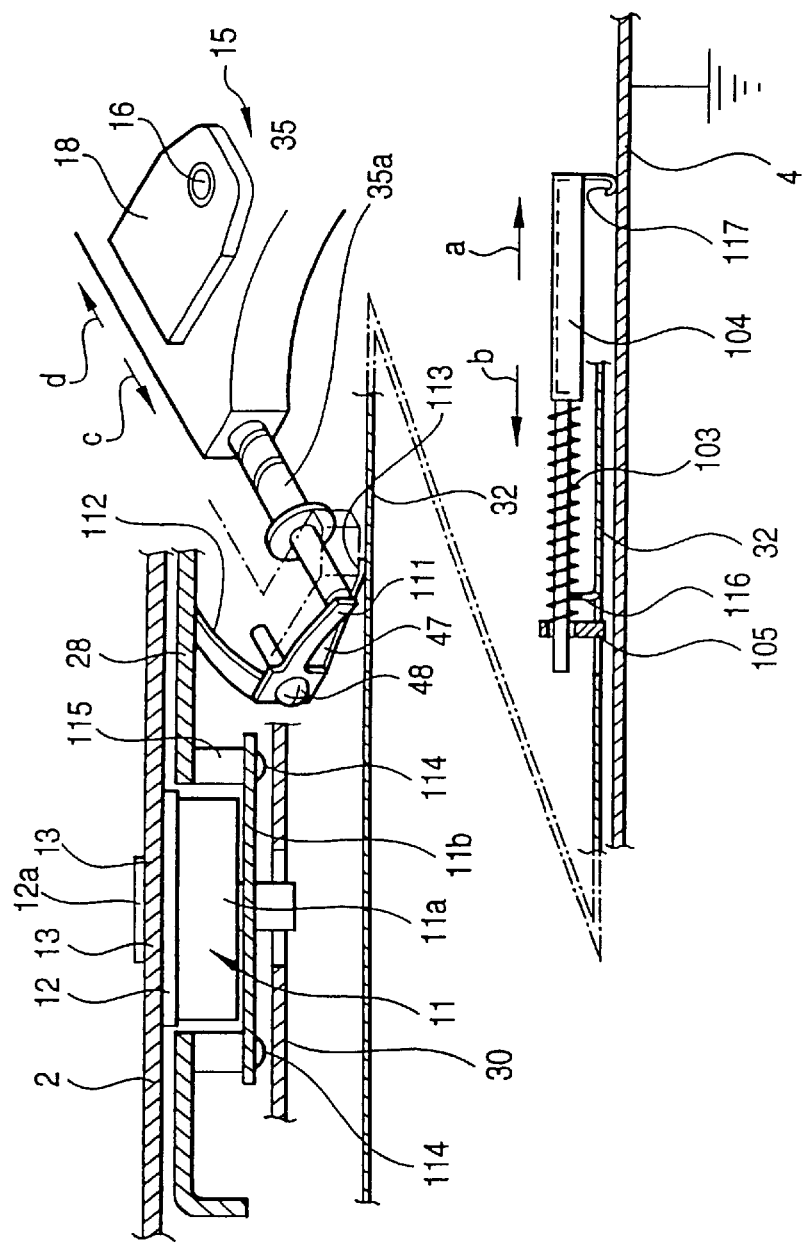
FIG. 27 is a sectional view illustrating how grounding is effected in the optical disc drive of FIG. 2 by utilizing a thrust pressurizing spring.

Next, a grounding method of the carriage 18 etc. will be described with reference to FIGS. 26 and 27.

The pressurizing spring 47 that is screwed on the unit base 40 of the carriage transport mechanism unit 41 is a leaf spring formed by a conductive metal plate of stainless steel or the like. Three elastic pieces, that is, a pressing portion 111 for pressing one end 35a of the lead screw 35 in the axial direction and a pair of (top and bottom) grounding contact portions 112 and 113 that extend to the top and bottom surfaces of the unit base 40, respectively, are formed integrally with the pressurizing spring 47. The pressing portion 111 also serves as a grounding contact portion. The carriage 18 and the lead screw 35 are made of a conductive metal such as stainless steel, and the unit chassis 28 as the spindle motor 11 mounting base and the chassis cover 71 that is screwed on the top surface of the unit chassis 28 are also made of a conductive metal such as stainless steel. All of a rotor 11a, which is formed with the disc table 12 at the top end, of the spindle motor 11, a yoke plate 11b, the spindle motor 11, etc. are made of conductive metals such as stainless steel, iron, etc. The spindle motor 11 is fixed to the bottom portion of the unit chassis 28 with a plurality of set screws 114 and pedestals 115 that are made of metal. The shield cover 32 and the ejection spring 103 are made of a conductive metal such as stainless steel. The ejection slider 104 and the bottom chassis 4 and the top cover 5 of the drive main body 3 are made of a conductive metal such as iron.

When the unit base 40 is screwed on the bottom portion of the unit chassis 28, the top grounding contact portion 112 of the pressurizing spring 47 is brought into pressurized contact with the bottom surface of the unit chassis 28 against its resilience. When the shield cover 32 is screwed on the bottom portion of the drawer main body 6a, the bottom grounding contact portion 113 of the pressurizing spring 47 is brought into pressurized contact with the top surface of the shield cover 32 against its resilience.

On the other hand, a grounding contact portion 116 that extends from the shield cover 32 and bent upward is in contact with the end portion (in the direction indicated by arrow b) of the ejection spring 103. A grounding contact portion 117 that extends from the end portion (in the direction indicated by arrow a) and bent downward is in contact with the top surface of the bottom chassis 4 of the drive main body 3 so as to be slidable in the directions of arrows a and b. When the optical disc drive 1 is incorporated in a host computer such as a notebook-sized personal computer, grounding is effected to the grounding path of the host computer side via the bottom chassis 4 and/or the top cover of the drive main body 3. The printed circuit boards such as the main circuit board 30 are electrically insulated from the above metal portions.

Therefore, even if static electricity enters the carriage 18, the unit chassis 28, the chassis cover 71, the spindle motor 11, or some other part when, for example, the user who is charged with static electricity directly touches it with his hand, the static electricity is safely led to the grounding path of the host computer via the pressing portion 111 and the grounding contact portions 112 and 113 of the pressurizing spring 47, the shield cover 32, the grounding contact portion 116, the ejection spring 103, the ejection slider 104, the grounding contact portion 117, and the bottom chassis 4 and the top cover 5. This prevents faint signals such as signals on the disc format that flow through the circuits on the main circuit board 30 etc. from being broken by static electricity, thereby securing the high reliability of the optical disc drive 1. Even with such an advantage, it is not necessary to add new dedicated grounding means because the pressurizing spring 47 also serves as a grounding means. Therefore, a highly reliable optical disc drive can be realized at a low cost without increasing the numbers of parts and assembling steps.

(8) Disc Protection Member of Drawer

Next, a disc protection member that is provided on the drawer main body 6a will be described with reference to FIGS. 1(a)–1(C), 20, and 28.

As shown in FIG. 19, in the optical disc drive 1, the width $W_4$ of the drawer main body 6a is smaller than the diameter D of the optical disc 2, and when the optical disc 2 is mounted on the disc table 12 of the drawer 6 the right-hand portion of the optical disc 2 projects rightward from the drawer main body 6a by a projection length $P_3$ that is smaller than ¼ of the diameter D of the optical disc 2. In this case, if the optical disc 2 is inclined inadvertently as shown in FIG. 1(A) in an attempt of mounting the optical disc 2 on the disc table 12 according to the self-chucking method, the data recording surface 2a of the optical disc 2 might hit the hard edge 6h of the drawer main body 6a on the optical disc 2 projection side and might be scratched easily or damaged due to impact. Even when the optical disc 2 is mounted on the disc table 12 levelly, if the mounting force is so strong that the outer circumference 2b of the optical disc 2 is bent down as shown in FIG. 1(B), the data recording surface 2a of the optical disc 2 might also hit the hard edge 6h of the drawer main body 6a on the optical disc 2 projection side and might be scratch easily or damaged due to impact. Further, when the optical disc 2 is removed from the disc table 12, if the optical disc 2 is inclined inadvertently as shown in FIG. 1(C), the data recording surface 2a of the optical disc 2 might also hit the hard edge 6h of the drawer main body 6a on the optical disc 2 projection side and might be scratched easily or damaged due to impact. In such a case, the reliability of data is extremely lowered.

Figure 28:
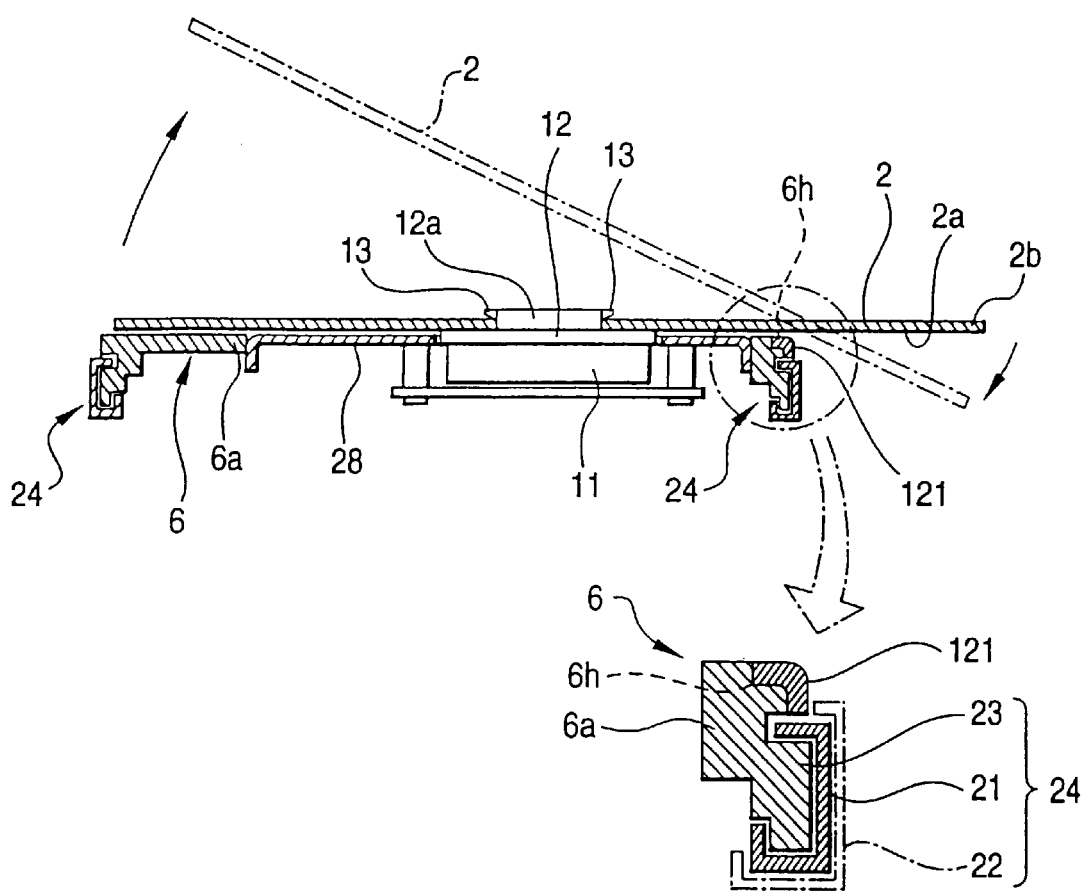
FIG. 28 is a sectional view taken along line K—K in FIG. 20 and illustrating a disc protection member that is provided on the drawer of the optical disc drive of FIG. 2.

In view of the above, in the optical disc drive 1, as shown in FIGS. 19 and 28, a disc protection member 121 is provided along the edge 6h of the drawer main body 6 on the optical disc 2 projection side by bonding, screwing, an engaging method using a mechanical engaging means such as fitting that uses protrusions and holes, coating, or some other method. Although it is preferable that the disc protection member 121 be made of a protection material of a rubber type, a urethane type, or the like, it may be made of a non-elastic material. In this embodiment, specifically, a recess as an engaging means is formed on part of the edge 6h and a rubber-type protection sheet is bonded to the recess with an adhesive tape.

Since the disc protection member 121 is provided on the edge 6h of the drawer main body 6a, even if, for example, the optical disc 2 is inadvertently inclined or its outer circumference 2b is bent down in an attempt of mounting or removing the optical disc 2 on or from the disc table 12 so that the recording surface 2a of the optical disc 2 would otherwise hit the hard edge 6h, the recording surface 2a actually hits the disc protection member 121. This prevents the recording surface 2a from directly hitting the hard edge 6h and thereby being scratched or damaged by impact. Therefore, the reliability of data recording (writing) and/or reproduction (reading) on the optical disc 2 as well as the durability of the optical disc 2 can greatly be increased. If the disc protection member 121 is made of an elastic material of a rubber type, an urethane type, or the like, the impact when the optical disc 2 hits the disc protection member 121 can be reduced and the optical disc 2 is prevented from being damaged by the hit. Although the disc protection member 121 may be provided over the entire region of the edge 6h of the drawer main body 6a, the above-described problems can be solved by providing it only in the region that faces the optical disc 2 that is mounted on the disc table 12 as shown in FIG. 20.

(9) Assembling of Bottom Chassis and Top Cover of Drive Main Body

Next, the assembling of the bottom chassis 4 and the top cover 5 that constitute the outer chassis of the drive main body 3 will be described with reference to FIGS. 4 to 8 and FIGS. 29 to 33(A)–33(C).

The bottom periphery of the right-hand side portion 5a of the top cover 5 is formed with two projections 131 that are bent inward (i.e., leftward) so as to extend horizontally at positions close to both ends in the front-rear direction (i.e., the directions indicated by arrows a and b). The bottom periphery of the left-hand side portion 5b is formed with two projections 132 that are bent inward (i.e., rightward) so as to extend horizontally at two positions on the front end side. The bottom periphery of the rear side portion 5c is formed with one projection 133 that is bent inward (i.e., forward) so as to extend horizontally at a position close to the right end. The right, left, and rear side portions 4a, 4b, and 4c of the bottom chassis 4 is formed with five horizontal slits 134–136 at positions that face the above five projections 131–133, respectively. Five slide engagement means 137–139 are formed by the projections 131–133 and the slits 134–136. The right-hand slits 134 are longer than the front-rear length of the right-hand projections 131. Cuts 140 are formed adjacent to the rear ends of the respective left-hand slits 135. In this embodiment, connection pieces 141 that are bent inward (i.e., rightward) are formed integrally with the left-hand side portion 4b above the respective cuts 140, to prevent the strength of the left-hand side portion 4b from being reduced by the formation of the cuts 140. A screw insertion hole 142 is formed in a corner portion of the top portion of the top cover 5 between the left-hand side portion 5b and the rear side portion 5c. A tapping hole 144 is formed in a screwing piece 143 that is bent inward (i.e., rightward) so as to extend horizontally from the rear end of the left-hand side portion 4b of the bottom chassis 4. A set screw 145 is used as a slide preventing means.

Figure 29:
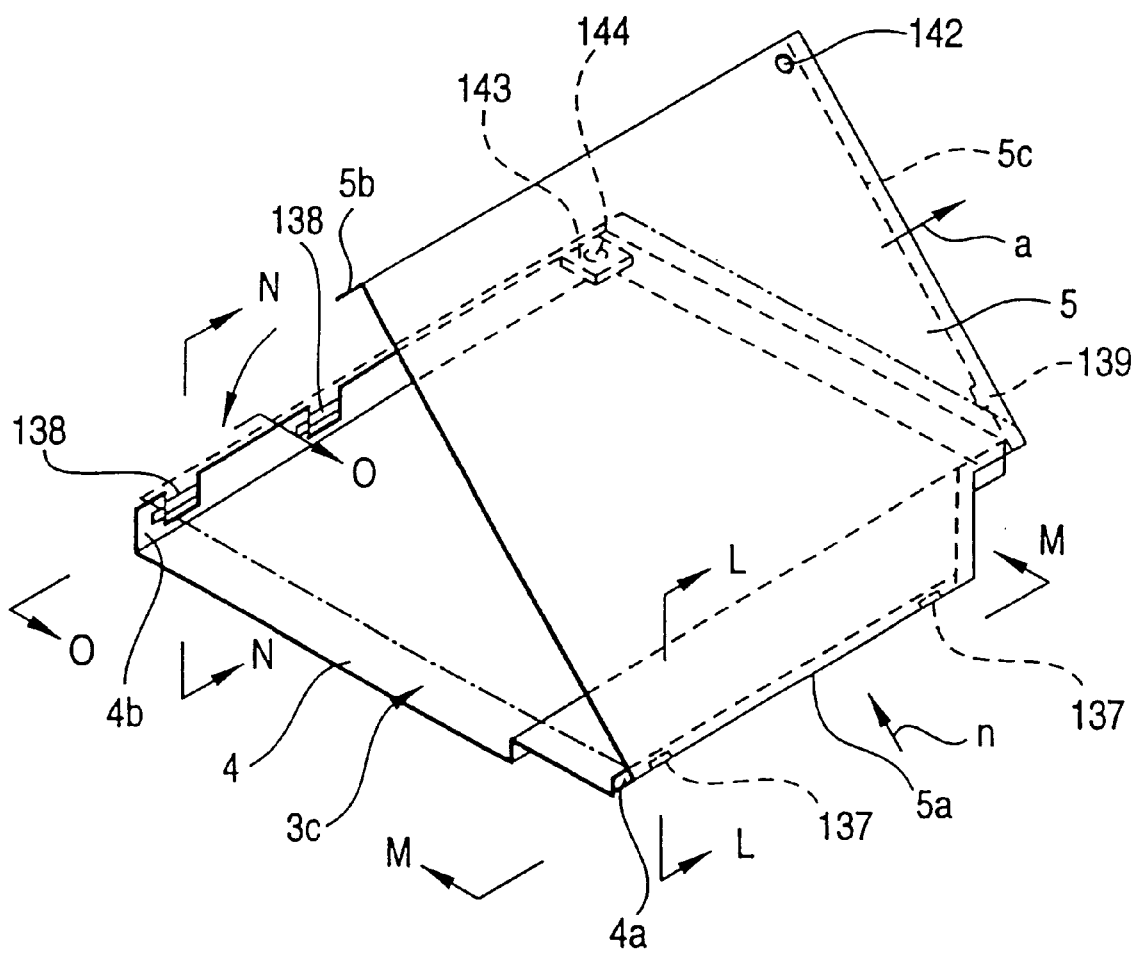
FIG. 29 is a perspective view illustrating an initial stage of a procedure of attaching the top cover to the bottom chassis of the optical disc drive of FIG. 2.
Figure 30:
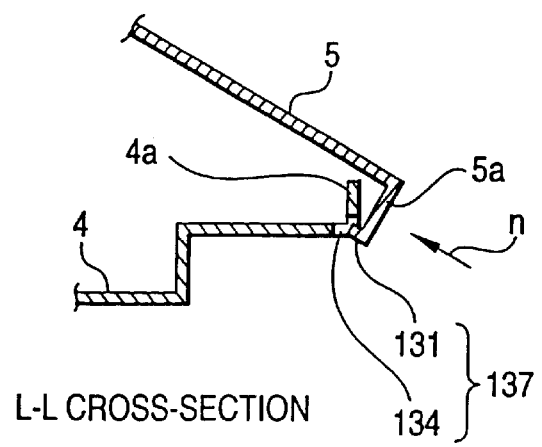
FIGS. 30(A)–30(C) are sectional views taken along line L—L in FIG. 29 and a partial right-hand side view as viewed according to arrows M in FIG. 29, respectively, and showing right-hand slide engagement portions of the bottom chassis and the top cover.
Figure 30:
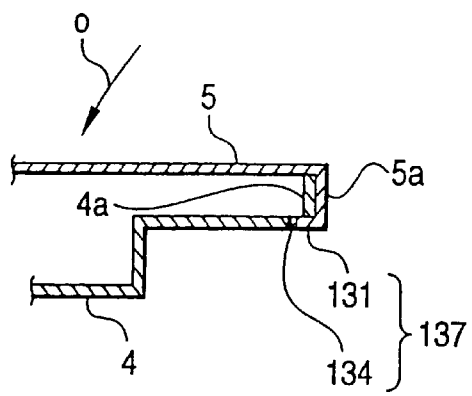
Figure 30:
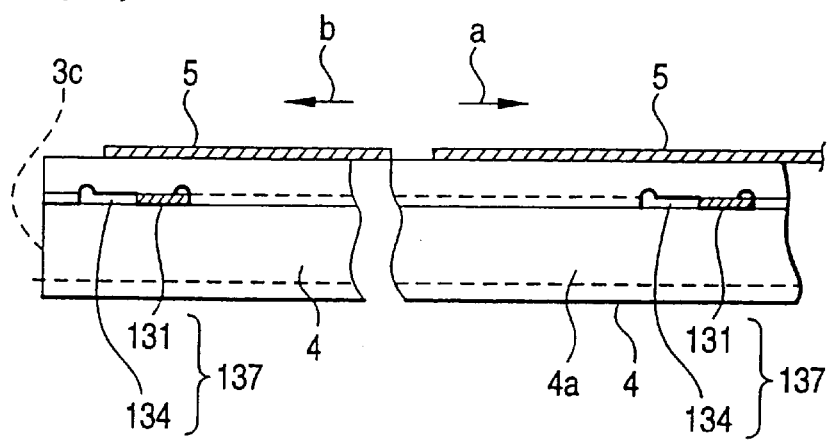
Figure 31:
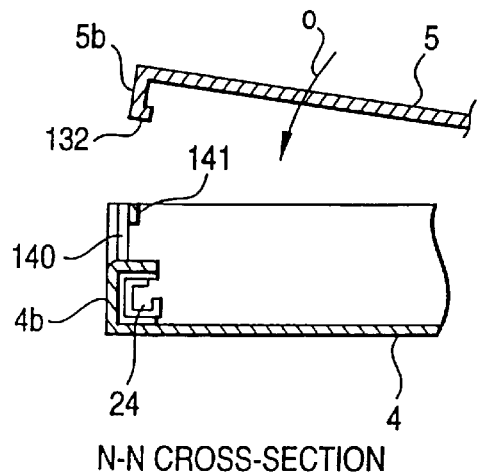
FIGS. 31(A)–31(D) are sectional views taken along line N—N in FIG. 29, a partial left-hand side view as viewed according to arrows O in FIG. 29, and a partial top view as viewed according to arrows P in FIG. 31(C), respectively, and showing left-hand slide engagement portions of the bottom chassis and the top cover.
Figure 31:
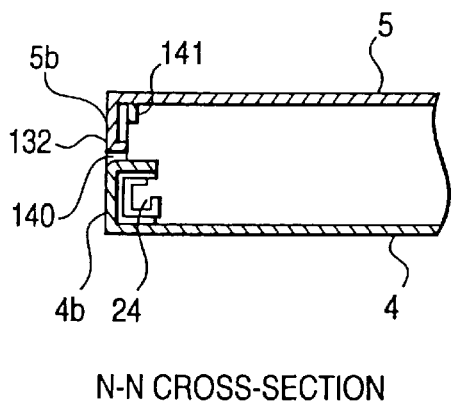
Figure 31:
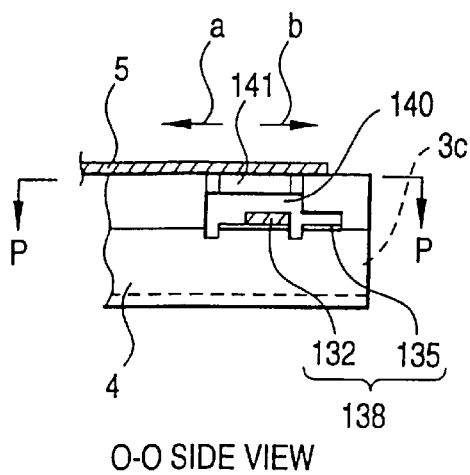
Figure 31:
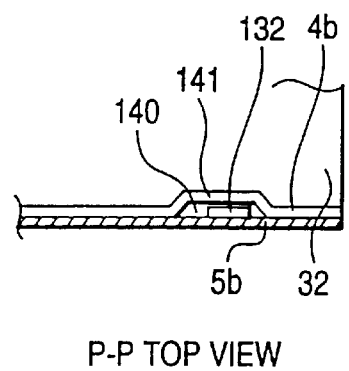
Figure 32:
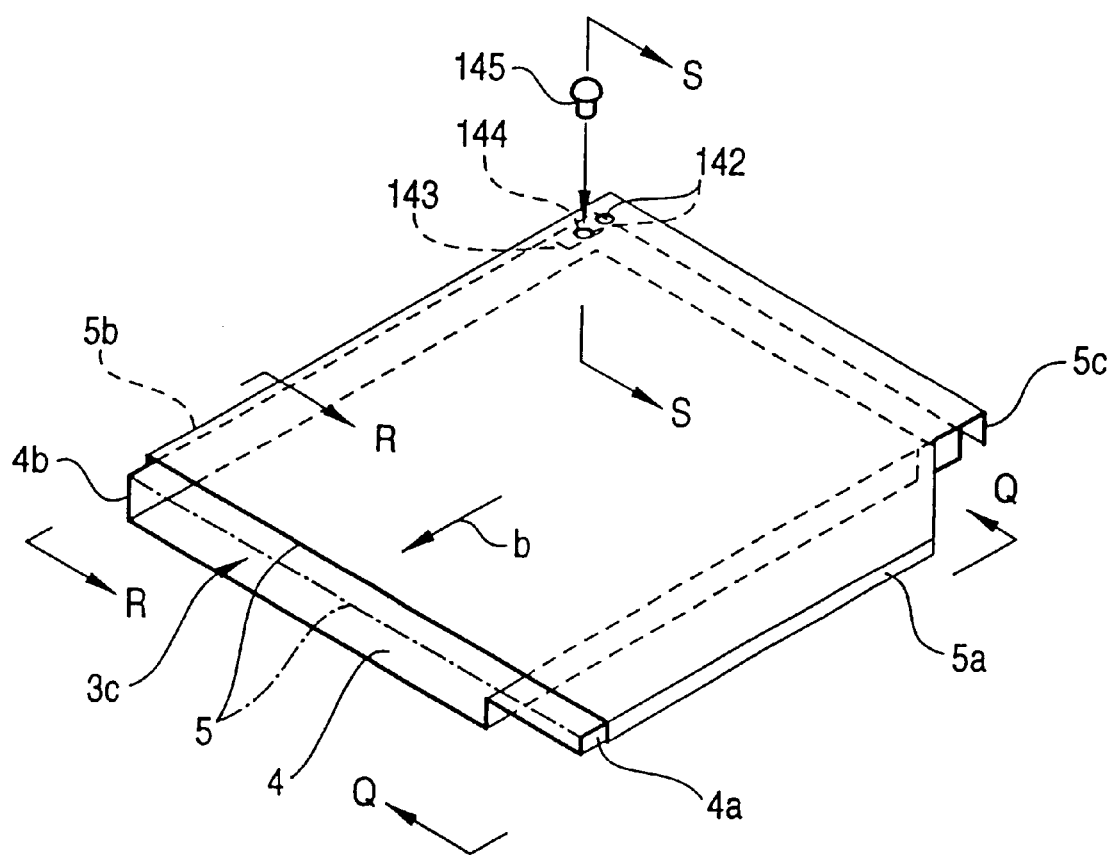
FIG. 32 is a perspective view illustrating a final stage, following the initial stage of FIG. 29, of the procedure of attaching the top cover to the bottom chassis.
Figure 33:
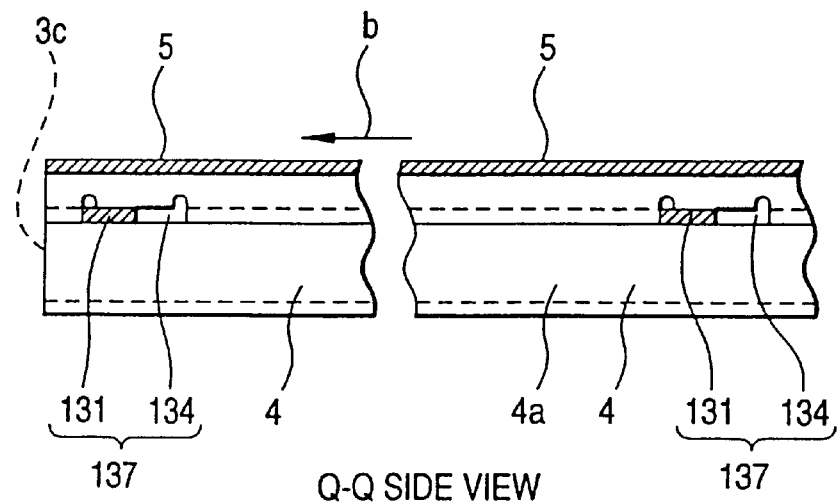
FIG. 33(A) is a partial right-hand side view as viewed according to arrows Q in FIG. 32.
FIG. 33(B) is a partial left-hand side view as viewed according to arrows R in FIG. 32.
FIG. 33(C) is a sectional view taken along line S—S in FIG. 32.
Figure 33:
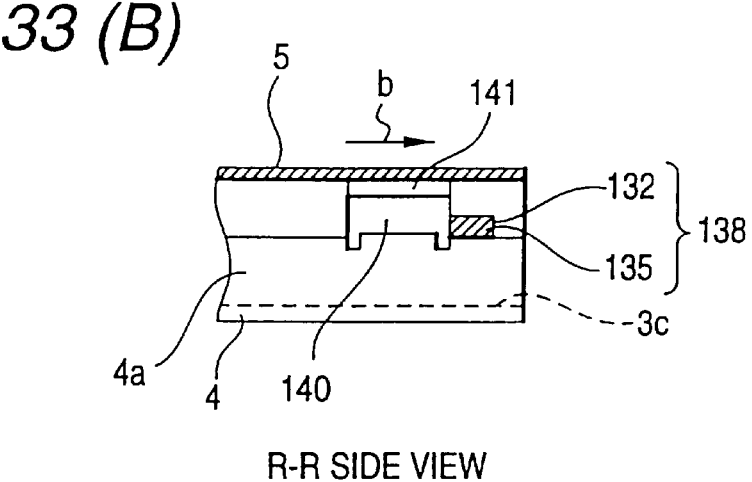
Figure 33:
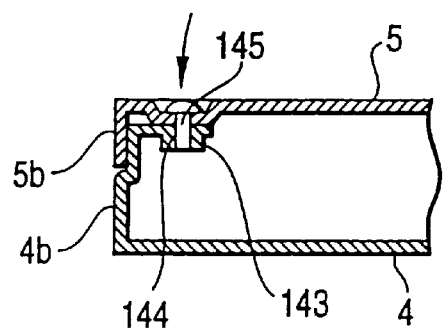

To attach the top cover 5 to the bottom chassis 4, as shown in FIGS. 29 and 30(A), the two right-hand projections 131 are engaged with the two right-hand slits 134 obliquely from below (i.e., in the direction indicated by arrow n) in a state that the top cover 5 is slightly deviated from the bottom chassis 4 rearward (i.e., in the direction indicated by arrow a) so that the rear projection 133 of the top cover 5 does not hit the top portion of the rear side portion 4c of the bottom chassis 4. By utilizing the hinge function of the two pairs of projections 131 and slits 134 on the right side, the top cover 5 is rotated in the direction of arrow o and thereby placed levelly on the top portion of the bottom chassis 4 as shown in FIGS. 29 (chain lines), 30(B), and 32 (solid lines).

As a result, as shown in FIGS. 31(A)–31(D), the right-hand and left-hand side portions 5a and 5b of the top cover 5 are placed on the outer surfaces of the right-hand and left-hand side portions 4a and 4b of the bottom chassis 4 and the two left-hand projections 132 of the top cover 5 are inserted into the two left-hand cuts 140 of the bottom chassis 4 in the direction of arrow o. Then, as indicated by a chain line in FIG. 32, the top cover 5 is slid forward (i.e., in the direction indicated by arrow b) on the bottom chassis 4 to its regular assembled position and the rear side portion 5c of the top cover 5 is thereby brought into contact with the rear side portion 4c of the bottom chassis 4 in the direction of arrow b. As a result, as shown in FIGS. 33(A)–33(C), while the two right-hand projections 131 are slid in the two respective right-hand slits 134 in the direction of arrow b, the two left-hand projections 132 are engaged with the two respective left-hand slits 135 and the one rear projection 133 is engaged with the one rear slit 136 in the direction of arrow b.

As a result of the above operations, the five slide engagement means 137–139 are rendered in complete engagement states and thereby prevent the top cover 5 from rising from the bottom chassis 4. As a result of the top cover 5's sliding on the bottom chassis 4 to its regular assembled position in the direction of arrow b, the screw insertion hole 142 of the top cover 5 is moved to the position right above the tapping hole 144 of the bottom chassis 4. Then, one set screw 145 is inserted into the screw insertion hole 142 and screwed into the tapping hole 144, whereby the one set screw 145 prevents the top cover 5 from sliding in the direction of arrow a and retracing from the bottom chassis 4. The assembling of the top cover 5 and the bottom chassis 4 is thus completed.

Therefore, according to this optical disc drive 1, the one set screw 145 which is a minimum fastening means allows the bottom chassis 4 and the top cover 5 to be assembled extremely easily. The numbers of parts and assembling steps can be decreased and the cost can be reduced. Further, the productivity can be increased by virtue of the improved assembling operations. Even with those advantages, the bottom chassis 4 and the top cover 5 can be fastened to each other strongly in the vertical direction mainly by means of the five slide engagement means 137–139 and the one set screw 145 is required to merely prevent the top cover 5 from sliding with respect to the bottom chassis 4 in the direction of arrow a.

When this optical disc drive 1 is incorporated in a host computer, a load of separating the bottom chassis 4 and the top cover 5 from each other in the vertical direction acts them. However, the five slide engagement means 137–139 can well sustain such a load and hence almost none of the load acts on the one set screw 145. Therefore, even with the single set screw 145, the top cover 5 can firmly be attached to the bottom chassis 4 to provide a very strong drive main body. Although in this embodiment the set screw 145 is used as the slide preventing means, various engagement members such as a snap pin and other hooking means may be used instead.

Although the invention has been described above by using the embodiment, the invention is not limited to the above embodiment and various modifications are possible based on the technical concepts of the invention. For example, although in the embodiment the drawer 6 that is mounted with the spindle motor 11 etc. is used as the disc transport means, a tray may be used that is inserted into and removed from the drive main body 3 while carrying only the optical disc 2. Further, the invention is not limited to the optical disc drive and can be applied to various disc drives that perform recording and/or reproduction on various disc-shaped recording media.

What is claimed is:

1. A disc drive comprising:
    a lead screw for moving a carriage having pickup means for performing recording and/or reproduction on a disc-shaped recording medium in a radial direction of the disc-shaped recording medium;
    a motor for driving the lead screw via a transmission mechanism;
    a one-piece unit base mounted with the motor and the transmission mechanism, for supporting a first end of the lead screw in a detachable manner; and
    a lead screw detachment member attached to the unit base in a detachable manner, for supporting a second end of the lead screw in a detachable manner.

2. The disc drive according to claim 1, further comprising:
    a thrust receiving member formed on the lead screw detachment member; and
    pressurizing means attached to the unit base, for elastically pressing the second end of the lead screw against the thrust receiving member in an axial direction.

3. The disc drive according to claim 1, further comprising a skew adjustment mechanism for rotationally adjusting the unit base with respect to a unit chassis that is mounted with a spindle motor by rotating the unit base around a hinge.

4. The disc drive according to claim 1, further comprising pressurizing means for elastically pressing the lead screw against a thrust receiving member, and for effecting grounding between the carriage and a unit chassis that is mounted with a spindle motor.

5. The disc drive according to claim 4, wherein the pressurizing means further effect grounding between the unit chassis and a drive main body.

6. The disc drive according to claim 4, wherein the pressurizing means grounds the carriage, the spindle motor, and the unit chassis together to the drive main body.

7. The disc drive according to claim 4, wherein the pressurizing means is an integral member of a metal pressurizing spring and a plurality of grounding contact portions.

* * * * *